US012548505B2

(12) United States Patent
Kwon et al.

(10) Patent No.: US 12,548,505 B2
(45) Date of Patent: Feb. 10, 2026

(54) DISPLAY DRIVING CIRCUIT FOR OPTIMIZING BIAS SETTING OF SOURCE AMPLIFIER AND OPERATING METHOD OF DISPLAY DRIVING CIRCUIT

(71) Applicant: SAMSUNG ELECTRONICS CO., LTD., Suwon-si (KR)

(72) Inventors: Taeksu Kwon, Suwon-si (KR); Insuk Kim, Suwon-si (KR); Jeeyeon Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/908,330

(22) Filed: Oct. 7, 2024

(65) Prior Publication Data

US 2025/0131877 A1 Apr. 24, 2025

(30) Foreign Application Priority Data

Oct. 19, 2023 (KR) ........................ 10-2023-0140611
Dec. 29, 2023 (KR) ........................ 10-2023-0197643

(51) Int. Cl.
*G09G 3/3225* (2016.01)

(52) U.S. Cl.
CPC ... *G09G 3/3225* (2013.01); *G09G 2310/0251* (2013.01); *G09G 2310/0291* (2013.01); *G09G 2310/08* (2013.01); *G09G 2330/023* (2013.01); *G09G 2330/028* (2013.01)

(58) Field of Classification Search
CPC ......... G09G 3/3225; G09G 2310/0251; G09G 2310/0291; G09G 2310/08; G09G 2330/023; G09G 2330/028
See application file for complete search history.

(56) References Cited

U.S. PATENT DOCUMENTS 10,147,381 B2 12/2018 Lee et al.
10,497,296 B2 12/2019 Jeong et al.
11,410,594 B1 8/2022 Chen et al.
11,521,526 B2 12/2022 Nohtomi et al.
2003/0095118 A1* 5/2003 Kato .................... G09G 3/3688 345/213
2004/0252116 A1* 12/2004 Tobita .................. G09G 3/3688 345/211
2005/0128113 A1* 6/2005 Kyung-Myun ...... G09G 3/3688 341/138

(Continued)

*Primary Examiner* — Kwang-Su Yang
(74) *Attorney, Agent, or Firm* — Sughrue Mion, PLLC

(57) ABSTRACT

A display driving circuit includes an operational amplifier configured to, in a first phase of a test period, charge a source line of a display panel based on a first voltage received through a first input terminal, and in a second phase of the test period, output a comparison result signal by comparing a second voltage received through the first input terminal with a source line voltage received through a second input terminal; a discharge circuit configured to discharge the source line in the second phase; switches configured to, in the first phase, connect an output terminal of the operational amplifier to the source line, and in the second phase, connect the discharge circuit to the source line and the second input terminal of the operational amplifier; and a control logic configured to control a bias current of the operational amplifier based on the comparison result signal.

20 Claims, 22 Drawing Sheets

(56) References Cited

U.S. PATENT DOCUMENTS

| | | | | |
|---|---|---|---|---|
| 2012/0146720 | A1* | 6/2012 | Hsu | H03F 3/45632 330/69 |
| 2019/0156756 | A1* | 5/2019 | Aizawa | G09G 3/3258 |
| 2022/0319403 | A1 | 10/2022 | Shiibayashi et al. | |
| 2023/0169898 | A1 | 6/2023 | Tsuchi | |
| 2023/0206805 | A1 | 6/2023 | Lee et al. | |
| 2024/0031708 | A1* | 1/2024 | Iwata | H04N 23/667 |

* cited by examiner

<First phase of Test Period>

<Second Phase of Test Operation>

DISPLAY DRIVING CIRCUIT FOR OPTIMIZING BIAS SETTING OF SOURCE AMPLIFIER AND OPERATING METHOD OF DISPLAY DRIVING CIRCUIT

CROSS-REFERENCE TO RELATED APPLICATION

This application is based on and claims priority under 35 U.S.C. § 119 to Korean Patent Application No. 10-2023-0140611, filed on Oct. 19, 2023, and Korean Patent Application No. 10-2023-0197643, filed on Dec. 29, 2023, in the Korean Intellectual Property Office, the disclosures of which are herein incorporated by reference in their entirety.

BACKGROUND

One or more example embodiments of the disclosure relate to a semiconductor device, and more particularly, to a display driving circuit for driving a display panel to display an image on the display panel and an operating method of the display driving circuit.

A display apparatus includes a display panel on which an image is displayed and a display driving circuit for driving the display panel. The display driving circuit may drive the display panel by receiving image data provided externally and allowing a plurality of source amplifiers to apply image signals corresponding to the received image data to source lines of the display panel. The source lines may be charged or discharged according to the image signals provided from the plurality of source amplifiers. As a slew rate of a source amplifier increases, a charging or discharging speed of a source line may increase and thus, a time for a voltage of the source line to reach a target voltage may decrease. On the other hand, because a slew rate of a source amplifier increases as a bias current of the source amplifier increases, power consumption of a display driving circuit including a plurality of source amplifiers increases as a slew rate of a source amplifier increases.

Recently, a number of pixels included in a display panel has increased as a resolution of the display panel has increased, and thus, a panel load deviation between display panels has increased. As a panel load is large, a time required to charge and discharge a source line of a display panel increases, and when a panel load is small, a time required to charge and discharge a source line decreases. Assuming that a slew rate of a source amplifier is the same, when a panel load is large, a voltage of a source line driven by the source amplifier may not reach a target voltage within a setting period. Accordingly, when a panel load is large, a charging and discharging speed of a source line needs to be increased by increasing a slew rate of a source amplifier by increasing a bias current of the source amplifier, and when a panel load is small, a bias current of the source amplifier needs to be reduced to reduce power consumption.

SUMMARY

One or more example embodiments of the disclosure provide a display driving circuit for adjusting a bias setting of a source amplifier according to a size of a panel load of a display panel, and an operating method of the display driving circuit.

According to an aspect of an example embodiment of the disclosure, there is provided a display driving circuit for driving a display panel including: an operational amplifier configured to, in a first phase of a test period, charge a source line of a display panel based on a first voltage received through a first input terminal, and in a second phase of the test period, output a comparison result signal by comparing a second voltage received through the first input terminal with a source line voltage received through a second input terminal; a discharge circuit configured to discharge the source line based on a third voltage in the second phase; a plurality of switches configured to, in the first phase, electrically connect an output terminal of the operational amplifier to the source line, and in the second phase, electrically connect the discharge circuit to the source line and the second input terminal of the operational amplifier; and a control logic configured to control a bias current of the operational amplifier based on the comparison result signal.

According to an example embodiment of the disclosure, there is provided a display driving circuit for driving a panel on which an image is displayed including: a plurality of source amplifiers, each of which is configured to, during a display period, buffer a source voltage received through a first input terminal and output the buffered source voltage to a corresponding source line from among a plurality of source lines of the panel; a charge/discharge circuit configured to, during a test period, charge or discharge a source line electrically connected to the charge/discharge circuit; and a plurality of switches configured to control an electrical connection between a second input terminal and an output terminal of a first source amplifier from among the plurality of source amplifiers and an electrical connection between the charge/discharge circuit and a first source line of the panel corresponding to the first source amplifier, wherein the first source amplifier is configured to, during the test period, output a comparison result signal by comparing a comparison voltage received through the first input terminal with a voltage of the first source line charged or discharged by the charge/discharge circuit.

According to an example embodiment of the disclosure, there is provided an operating method of a display driving circuit for driving a display panel includes: charging, by a source amplifier, a source line of a display panel based on a first voltage; discharging, by a charge/discharge circuit, the source line based on a second voltage lower than the first voltage; outputting, by the source amplifier, a comparison result signal by comparing a comparison voltage applied to a first input terminal with a voltage of the source line applied to a second input terminal; and adjusting, by a control logic, a bias control signal for controlling a bias current of the source amplifier based on a level of the comparison result signal obtained at a determination time point.

BRIEF DESCRIPTION OF DRAWINGS

Example embodiments will be more clearly understood from the following detailed description taken in conjunction with the accompanying drawings in which.

DETAILED DESCRIPTION

Various example embodiments will now be described with reference to the accompanying drawings.

Figure 1:
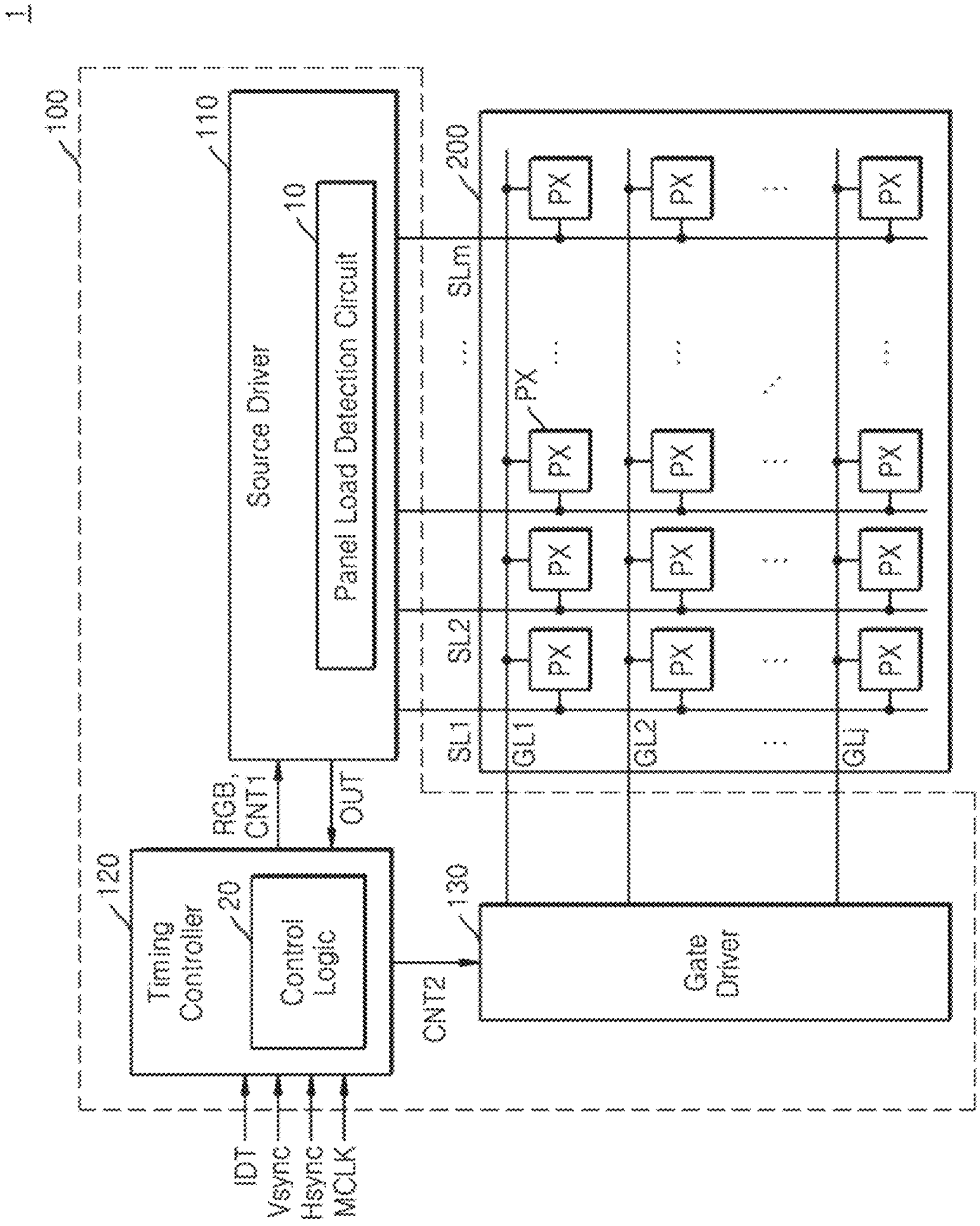
FIG. 1 is a block diagram illustrating a display apparatus, according to one or more example embodiments.
Figure 2:
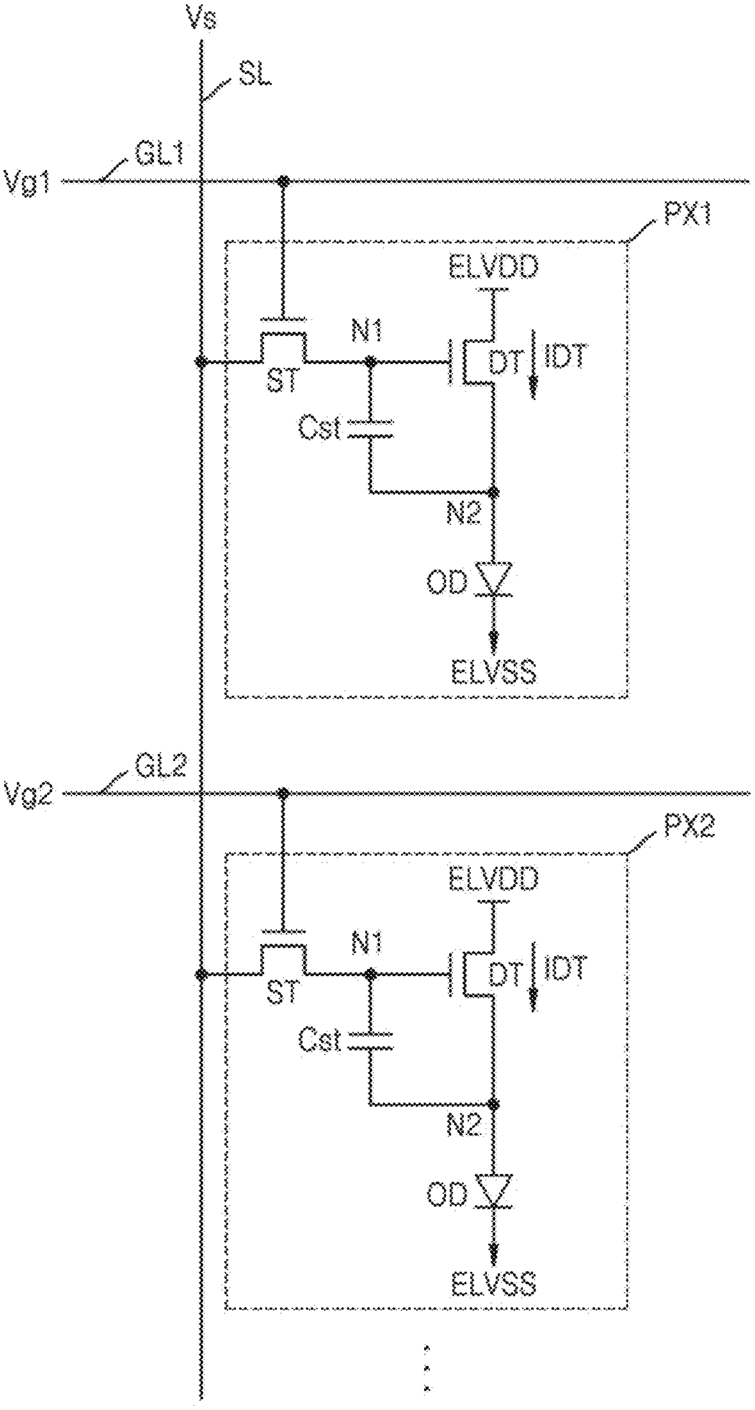
FIG. 2 illustrates an example of a display panel applied to a display apparatus, according to one or more example embodiments.

FIG. 1 is a block diagram illustrating a display apparatus, according to one or more example embodiments. FIG. 2 illustrates an example of a display panel applied to a display apparatus, according to one or more example embodiments.

A display apparatus 1 according to one or more example embodiments may be mounted on an electronic device having an image display function. Examples of the electronic device may include a smartphone, a tablet personal computer (PC), a portable multimedia player (PMP), a camera, a wearable device, a television, a digital video disk (DVD) player, a refrigerator, an air conditioner, an air cleaner, a set-top box, a robot, a drone, various medical devices, a navigation device, a global positioning system (GPS) receiver, a device for a vehicle, furniture, and various measuring devices.

Referring to FIG. 1, the display apparatus 1 includes a display panel 200 on which an image is displayed and a display driving circuit 100 (or referred to as a display driving integrated circuit) for driving the display panel 200.

In an embodiment, the display driving circuit 100 and the display panel 200 may be implemented as one module. For example, the display driving circuit 100 may be mounted on a surface of the display panel 200, or the display driving circuit 100 and the display panel 200 may be electrically connected to each other through a connection member such as a flexible printed circuit board (FPCB).

The display panel 200 may be a display unit on which an actual image is displayed, and may be one of display apparatuses configured to receive an electrically transmitted image signal and display a two-dimensional (2D) image based on the received image signal. The display apparatuses may include, for example, an organic light-emitting diode (OLED) display, a thin-film transistor-liquid crystal display (TFT-LCD), a field-emission display, or a plasma display panel (PDP). Hereinafter, in an example embodiment, it is assumed that the display panel 200 is an OLED display panel in which each pixel includes an OLED. However, the disclosure is not limited thereto. For example, the display panel 200 may be a flat panel display or a flexible display panel.

The display panel 200 includes a plurality of gate lines (e.g., GL1 to GLj), a plurality of source lines (e.g., SL1 to SLm) arranged in a direction intersecting the plurality of gate lines, and a plurality of pixels PX arranged at intersections between the plurality of gate lines and the plurality of source lines.

Each of the plurality of pixels PX may output light of a preset color, and two or more pixels PX (e.g., red, blue, and green pixels) arranged adjacent to each other in the same line or adjacent lines and outputting light of different colors may constitute one unit pixel. In this case, the two or more pixels PX constituting the unit pixel may be referred to as sub-pixels. The display panel 200 may have an RGB structure in which red, blue, and green pixels constitute one unit pixel. However, the disclosure is not limited thereto. For example, the display panel 200 may have an RGBW structure in which a unit pixel further includes a white pixel for improving luminance. Alternatively, a unit pixel of the display panel 200 may include a combination of pixels including a color pixel other than red, green, and blue pixels.

Referring to FIG. 2, a first pixel PX1 and a second pixel PX2 may be connected to a source line SL, the first pixel PX1 may be connected to a first gate line GL1, and the second pixel PX2 may be connected to a second gate line GL2.

Each of the first pixel PX1 and the second pixel PX2 may include an OLED OD and elements for providing a driving current IDT to the OLED OD. The elements may include a selection transistor ST, a driving transistor DT, and a storage capacitor Cst. At least one of the selection transistor ST and the driving transistor DT may be implemented as an oxide semiconductor thin-film transistor including an active layer formed of an oxide semiconductor or a low-temperature polysilicon (LTPS) thin-film transistor including an active layer formed of polysilicon. In an embodiment, the first pixel PX1 and the second pixel PX2 may further include an additional transistor for controlling an emission period and/or improving a driving characteristic.

A first terminal of the selection transistor ST may be connected to the source line SL, and a second terminal may be connected to a gate electrode of the driving transistor DT. A first terminal of the driving transistor DT may be connected to a first driving power source ELVDD, and a second terminal may be connected to an anode of the OLED OD. A cathode of the OLED OD may be connected to a second driving power source ELVSS. The storage capacitor Cst may be connected to the gate terminal and the second terminal of the driving transistor DT.

During a first horizontal period, when a first gate voltage Vg1 received through the first gate line GL1 is at a gate-on level, the selection transistor ST of the first pixel PX1 may be turned on, and then a source voltage Vs provided through the source line SL may be applied to the gate terminal of the driving transistor DT through the selection transistor ST. The driving current IDT generated based on the source voltage Vs may be provided to the OLED OD, and the OLED OD may emit light with a luminance corresponding to the driving current IDT. The storage capacitor Cst may store a voltage of the gate electrode of the driving transistor DT. Accordingly, even after the first horizontal period, the voltage of the gate electrode of the driving transistor DT may be maintained.

During a second horizontal period, when a gate voltage Vg2 received through the second gate line GL2 is at a gate-on level, the selection transistor ST of the second pixel PX2 may be turned on, and then the source voltage Vs provided through the source line SL may be applied to the gate terminal of the driving transistor DT through the selection transistor ST. The second pixel PX2 may operate as described with reference to the first pixel PX1.

Referring back to FIG. 1, the plurality of gate lines (e.g., GL1 to GLj) may be sequentially selected as described with reference to FIG. 2, a selection transistor of the pixels PX connected to a selected gate line may be turned on, a data signal including pixel information, for example, a source voltage, may be applied to each of the plurality of source lines (e.g., SL1 to SLm) by a source driver 110, and an OLED may emit light due to current flowing through the OLED of a corresponding pixel due to the data signal to perform a display operation.

The display driving circuit 100 may include a timing controller 120, the source driver 110, and a gate driver 130. The display driving circuit 100 may further include other components, for example, an interface circuit for receiving image data and control signals, a voltage generation circuit for generating voltages used in the display driving circuit 100, and intellectual property (IP) circuits for image processing of image data IDT.

In an embodiment, the timing controller 120, the source driver 110, and the gate driver 130 may be formed on one or more semiconductor chips. In an embodiment, the timing controller 120 and the source driver 110 may be formed of one or more semiconductors, and the gate driver 130 may be formed on the display panel (e.g., 200 in FIG. 1).

The timing controller 120 may control an overall operation of the display driving circuit 100, and may control components of the display driving circuit 100, for example, the source driver 110 and the gate driver 130 to display the received image data IDT on the display panel 200.

The timing controller 120 may receive the image data IDT and control signals from an outside. The control signals may include, for example, a vertical synchronization signal Vsync, a horizontal synchronization signal Hsync, and a clock signal MCLK. In an embodiment, the timing controller 120 may internally generate the vertical synchronization signal Vsync and the horizontal synchronization signal Hsync based on the clock signal MCLK. The vertical synchronization signal Vsync may indicate a frame period during which the image data IDT of one frame is displayed on the display panel 200, and the horizontal synchronization signal Hsync may indicate a horizontal period during which a data signal is provided to one row of the display panel 200.

The timing controller 120 may generate pixel data RGB obtained by converting a format of the image data IDT to meet an interface specification with the source driver 110 and output the pixel data RGB to the source driver 110. Also, the timing controller 120 may generate various control signals for controlling timings of the source driver 110 and the gate driver 130, output one or more first control signals CNT1 to the source driver 110, and outputs one or more second control signals CNT2 to the gate driver 130.

In an embodiment, the timing controller 120 may include a control logic 20 configured to control a bias current of a plurality of source amplifiers provided in the source driver 110. The control logic 20 may adjust a bias current setting of the plurality of source amplifiers based on a feedback signal, for example, a comparison result signal OUT, received from the source driver 110 during a test period.

The control logic 20 may be implemented as hardware or a combination of software (or firmware) and hardware. For example, the control logic 20 may be implemented as a hardware logic, may be implemented as any of various hardware logics such as an application specific IC (ASIC), a field programmable gate array (FPGA), or a complex programmable logic device (CPLD), or may be implemented as firmware or software running on a processor such as a microcontroller unit (MCU) or central processing unit (CPU), or a combination of a hardware device and software.

During a panel load test period of the display panel 200, the comparison result signal OUT may transition from a first level (e.g., logic low) to a second level (e.g., logic high). As a panel load decreases and a bias current of a source amplifier increases, a level transition time point of the comparison result signal OUT may be accelerated. The control logic 20 may obtain (or determine) a level of the comparison result signal OUT at a certain determination time point and may adjust a value of a bias setting signal based on the level of the comparison result signal OUT. When a value of a bias setting signal increases, a bias current of a source amplifier may increase and a transition time point of the comparison result signal OUT may be accelerated, and when a value of a bias setting signal decreases, a bias current of a source amplifier may decrease and a transition time point of the comparison result signal OUT may be delayed. The control logic 20 may adjust a value of a bias setting signal based on levels of a plurality of comparison result signals OUT obtained during a plurality of test periods, for example, during a plurality of sub-periods of a panel load test period.

In an embodiment, during a plurality of test periods, the control logic 20 may obtain a level of the comparison result signal OUT while fixing a value of a bias setting signal and changing a determination time point, or may obtain a level of the comparison result signal OUT while fixing a determination time point and increasing or decreasing a value of a bias setting signal. The control logic 20 may adjust a value of a bias setting signal based on a combination of a plurality of levels of the comparison result signal OUT obtained during the plurality of test periods or a change in the plurality of levels of the comparison result signal OUT. During a display period, the adjusted bias setting signal may be applied to the source driver 110. Accordingly, the control logic 20 may optimize a bias current of a source amplifier according to the size of a panel load of the display panel 200. A method of setting a bias current of a source amplifier, for example, a method of adjusting a bias control signal, will be described later in detail with reference to FIGS. 11A to 12.

The gate driver 130 may be connected to the plurality of gate lines (e.g., GL1 to GLj) of the display panel 200 and may sequentially select the plurality of gate lines (e.g., GL1 to GLj) by sequentially applying gate-on voltages to the plurality of gate lines (e.g., GL1 to GLj).

The source driver 110 may convert the pixel data RGB corresponding to one row received from the timing controller 120 into a plurality of data signals, for example, a plurality of source voltages, and may provide the plurality of source voltages to the plurality of source lines (e.g., SL1 to SLm). The source driver 110 may include a plurality of source amplifiers (e.g., 11 of FIG. 3), and the plurality of source amplifiers may output a plurality of source voltages to the plurality of source lines (e.g., SL1 to SLm). The plurality of source amplifiers may output a plurality of source voltages corresponding to the pixels PX connected to a selected gate line during each horizontal period.

In an embodiment, the source driver 110 may include a panel load detection circuit 10 configured to detect a panel load of the display panel 200. During a panel load test period, when at least one source line from among the plurality of source lines (e.g., SL1 to SLm) is charged or discharged, the panel load detection circuit 10 may compare a voltage of the source line indicating a charging or discharging speed with a comparison voltage and may output a comparison result as the comparison result signal OUT.

Assuming that a source line is discharged, when a voltage of the source line is higher than a comparison voltage, the comparison result signal OUT may be at a first level (e.g., logic low), and when the voltage of the source line becomes equal to or lower than the comparison voltage as the source line is discharged, the comparison result signal may transition from the first level to a second level (e.g., logic high)

Assuming that a source line is charged, when a voltage of the source line is lower than a comparison voltage, the comparison result signal OUT may be at a first level (e.g., logic low), and when the voltage of the source line becomes equal to or higher than the comparison voltage as the source line is charged, the comparison result signal may transition from the first level to a second level (e.g., logic high).

As described above, as a panel load decreases and a bias current of a source amplifier increases, a level transition time point of the comparison result signal OUT may be accelerated, and as a panel load increases and a bias current of a source amplifier decreases, a level transition time point of the comparison result signal OUT may be delayed. The control logic 20 may adjust a bias setting of a source amplifier in accordance with a panel load based on the comparison result signal OUT.

In an embodiment, the panel load detection circuit 10 may include one source amplifier from among the plurality of source amplifiers (e.g., 11 of FIG. 3), and the source amplifier may operate as a comparator during a panel load test period. A configuration and an operation of the panel load detection circuit 10 will be described below in detail with reference to FIGS. 3 to 10.

Figure 3:
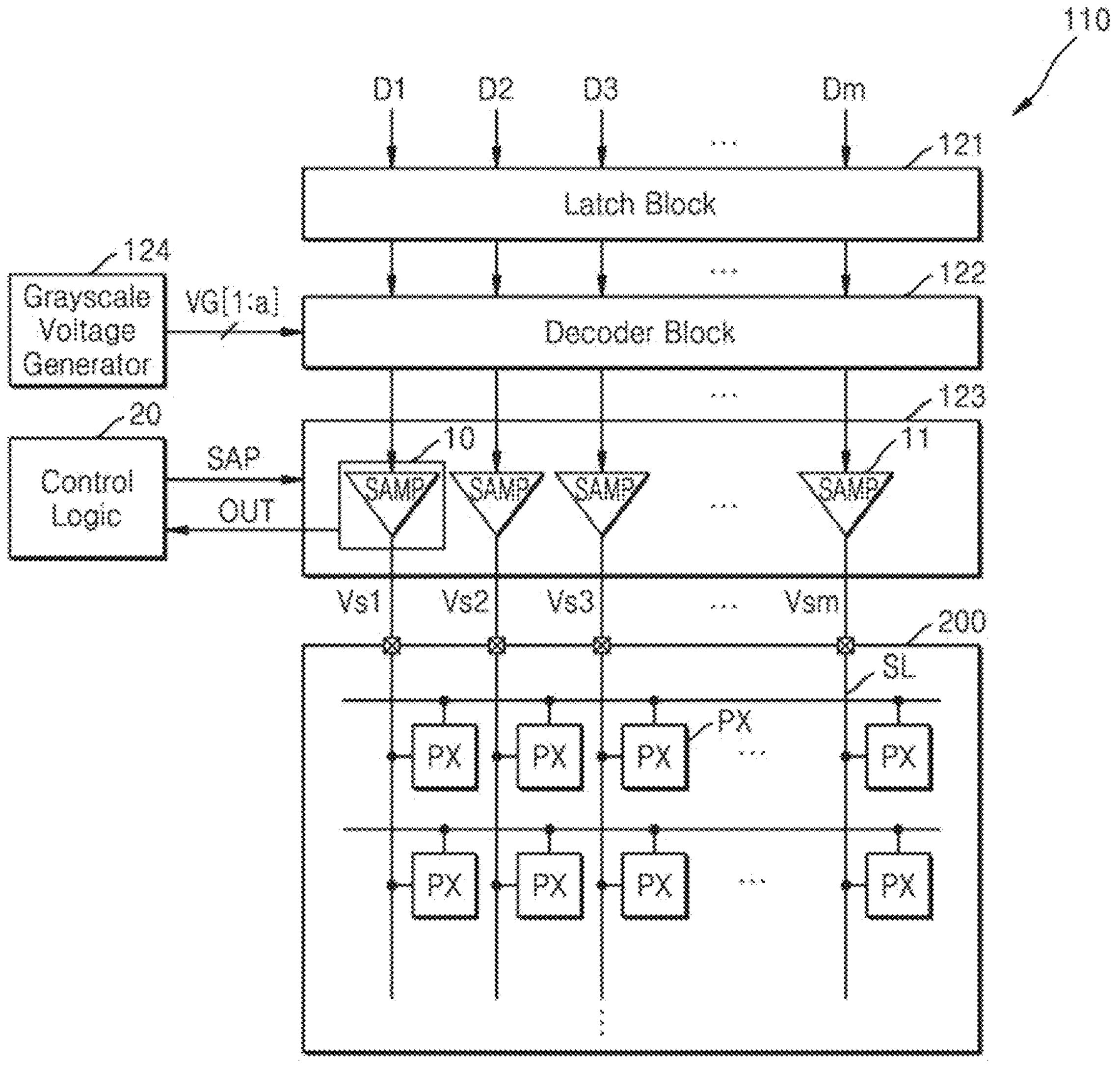
FIG. 3 illustrates a source driver, according to one or more example embodiments.

FIG. 3 illustrates a source driver, according to one or more example embodiments. For convenience of explanation, the display panel 200 and the control logic 20 are illustrated together.

Referring to FIG. 3, the source driver 110 may include a latch unit (or latch block) 121, a decoder unit (or decoder block) 122, a buffer unit 123, the panel load detection circuit 10, and a grayscale voltage generation circuit (or grayscale voltage generator) 124. In an embodiment, the grayscale voltage generation circuit 124 may be implemented as a circuit separate from the source driver 110.

The source driver 110 may include m channels respectively corresponding to m source lines SL and outputs m source voltages Vs1 to Vsm respectively corresponding to m pieces of pixel data D1 to Dm through the m channels.

The latch unit 121 may receive and latch the m pieces of pixel data D1 to Dm. The m pieces of pixel data D1 to Dm may correspond to pixel data RGB provided from the timing controller 120 of FIG. 1. The latch unit 121 may receive and store the m pieces of pixel data D1 to Dm, and output the stored m pieces of pixel data D1 to Dm in parallel to the decoder unit 122.

The decoder unit 122 may decode the m pieces of pixel data D1 to Dm corresponding to digital signals into analog voltages, for example, source voltages. The decoder unit 122 may include decoders corresponding to a number of channels of the source driver 110, and each decoder may decode pixel data, select any one grayscale voltage from among a plurality of grayscale voltages VG[1:a] (a is a positive integer of 2 or more) according to a decoding result, and output the selected grayscale voltage as a source voltage. For example, when each pixel data includes k bits (k is a positive integer of 2 or more) and the plurality of grayscale voltages VG[1:a] include $2^k$ grayscale voltages, each decoder may decode data including k bits and output any one grayscale voltage as a source voltage.

The grayscale voltage generation circuit 124 may generate the plurality of grayscale voltages VG[1:a] and provide the plurality of grayscale voltages to the decoders of the decoder unit 122. The grayscale voltage generation circuit 124 may include a plurality of resistor strings, a plurality of multiplexers, and a plurality of buffers. The grayscale voltage generation circuit 124 may buffer voltages, selected by the plurality of multiplexers, from among voltages generated by the plurality of resistor strings by using the plurality of buffers, may distribute the buffered voltages, and may output the distributed voltages as the plurality of grayscale voltages VG[1:a].

The buffer unit 123 may include a plurality of source amplifiers 11, and each of the plurality of source amplifiers 11 may buffer a grayscale voltage received from the decoder unit 122 and generate a source voltage based thereon. The plurality of source amplifiers 11 may generate the plurality of source voltages Vs1 to Vsm and may output the plurality of source voltages Vs1 to Vsm to the plurality of source lines SL.

The panel load detection circuit 10 may include at least one source amplifier 11 from among the plurality of source amplifiers 11 of the buffer unit 123. The source amplifier 11 may operate as a comparator during a panel load test period of the display panel 20. The comparison result signal OUT output from the source amplifier 11 may be provided to the control logic 20, and the control logic 20 may control a bias current of the plurality of source amplifiers 11 to suit a panel load of the display panel 200 based on the comparison result signal OUT. The control logic 20 may generate a bias control signal SAP for controlling a bias current of the plurality of source amplifiers 11 and may adjust the bias control signal SAP based on levels of the comparison result signal OUT obtained during a plurality of test periods of a panel load test period. The bias control signal SAP may correspond to a plurality of bits of a bias setting register, and the control logic 20 may change the bias control signal SAP by changing one or more of a plurality of bit values of the bias setting register.

In an embodiment, the bias control signal SAP may control at least one bias voltage provided to the source amplifier 11. As a value of the bias control signal SAP increases, a voltage level of a bias voltage may increase (or decrease). A bias current of the source amplifier 11 may increase based on the bias voltage whose voltage level increases (or decreases). In contrast, as a value of the bias control signal SAP decreases, a voltage level of a bias voltage may decrease (or increase). A bias current of the source amplifier 11 may increase based on the bias voltage whose voltage level decreases (or increases).

In an embodiment, the source amplifier 11 includes a plurality of switches that are used to provide a bias current, and the bias control signal SAP may control a number of switches that are turned on from among the plurality of switches. For example, when a value of the bias control signal SAP increases, the number of turned-on switches may increase, and thus, the bias current of the source amplifier 11 may increase. On the other hand, when a value of the bias control signal SAP decreases, the number of turned-on switches may decrease, and thus, the bias current of the source amplifier 11 may decrease.

Figure 4A:
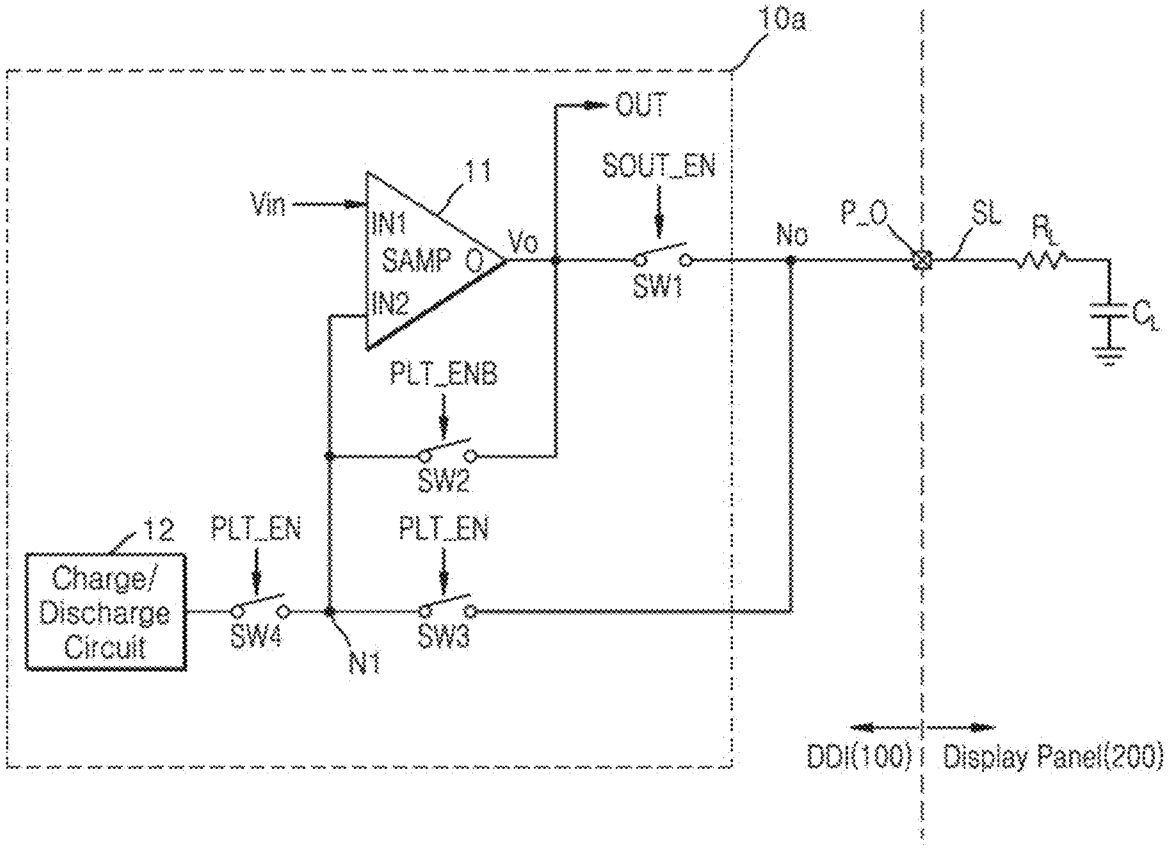
FIGS. 4A and 4B illustrate panel load detection circuits, according to example embodiments.
Figure 4B:
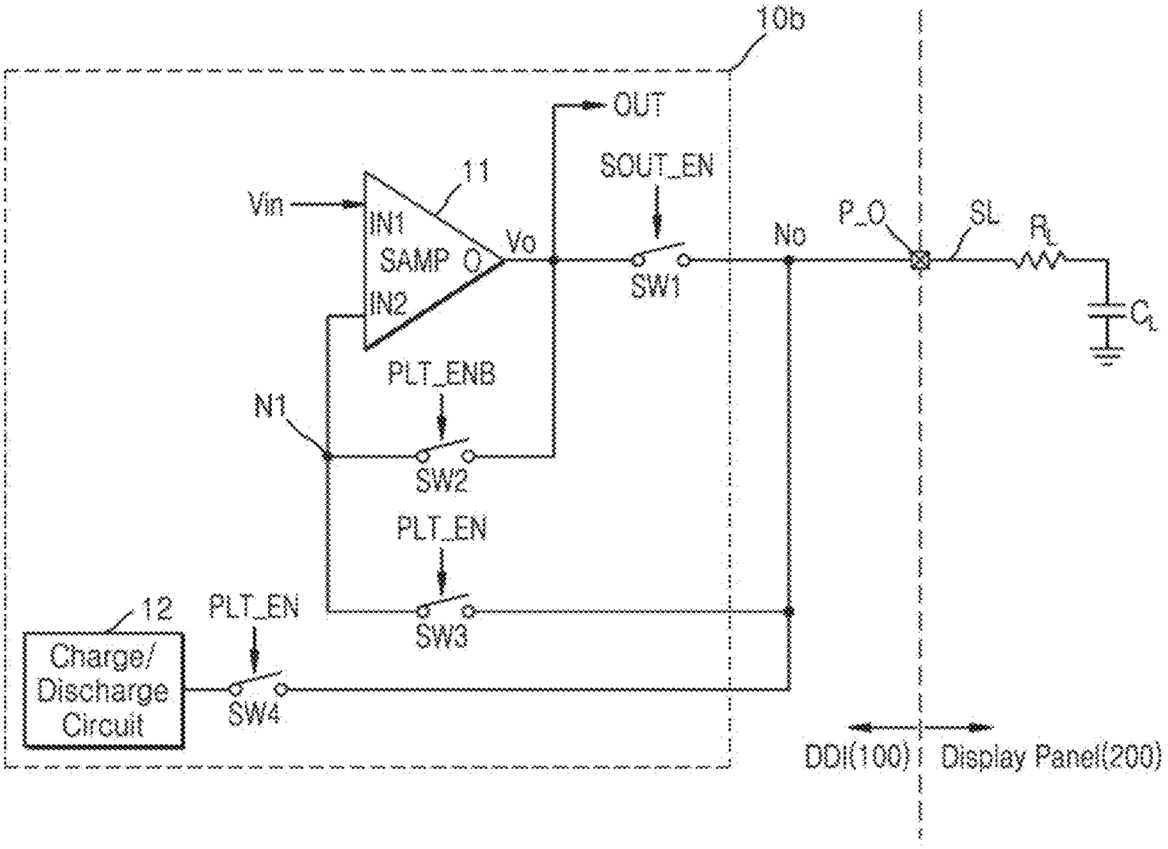

FIGS. 4A and 4B respectively illustrate panel load detection circuits 10*a* and 10*b*, according to example embodiments.

Referring to FIGS. 4A and 4B, the panel load detection circuit 10*a* may include the source amplifier 11, a charge/discharge circuit 12, and a plurality of switches, for example, first to fourth switches SW1 to SW4. The source line SL of the display panel 200 may be modeled with a load resistor $R_L$ and a load capacitor $C_L$, and the panel load detection circuit 10*a* may generate the comparison result signal OUT according to a panel load, for example, the load resistor $R_L$ and the load capacitor $C_L$, during a panel load test period.

The source amplifier 11 may include a first input terminal IN1, a second input terminal IN2, and an output terminal O. In an embodiment, the source amplifier 11 may be implemented as an operational amplifier. In an embodiment, the source amplifier 11 may be implemented as a rail-to-rail amplifier.

The plurality of switches may include first to fourth switches SW1 to SW4. In an embodiment, the first to fourth switches SW1 to SW4 may be implemented as transistors. For example, the first to fourth switches SW1 to SW4 may be implemented as P-type transistors, for example, metal-oxide-semiconductor field-effect transistors (MOSFETs) or N-type transistors. In an embodiment, the first to fourth switches SW1 to SW4 may be implemented as transmission gates. Although the embodiments of FIGS. 4A and 4B illustrate four switches SW1 to SW4, a number of the plurality of switches included in the panel load detection circuit 10*a* is not limited.

The first switch SW1 may be connected between the output terminal O of the source amplifier 11 and an output node No. The output node No may be electrically connected to an output pad P_O, and the output pad P_O may be connected to the source line SL of the display panel 200. The first switch SW1 may be turned on or turned off in response to an output enable signal SOUT_EN. The second switch SW2 may be connected between the output terminal O of the source amplifier 11 and a first node N1. The first node N1 may be connected to the second input terminal IN2 of the source amplifier 11. The second switch SW2 may be turned on or turned off in response to a test enable bar signal PLT_ENB. The test enable bar signal PLT_ENB may be a complementary signal to a test enable signal PLT_EN. The third switch SW3 may be connected between the output node No and the first node N1. In an embodiment, referring to FIG. 4A, the fourth switch SW4 may be connected between the first node N1 and the charge/discharge circuit 12. The third switch SW3 and the fourth switch SW4 may be turned on or turned off in response to the test enable signal PLT_EN. In an embodiment, referring to FIG. 4B, the fourth switch SW4 may be connected between the output node No and the charge/discharge circuit 12.

Referring to FIG. 4A, when the third switch SW3 and the fourth switch SW4 are turned on, the charge/discharge circuit 12 may be connected to the output node No to charge or discharge the source line SL.

Figure 5A:
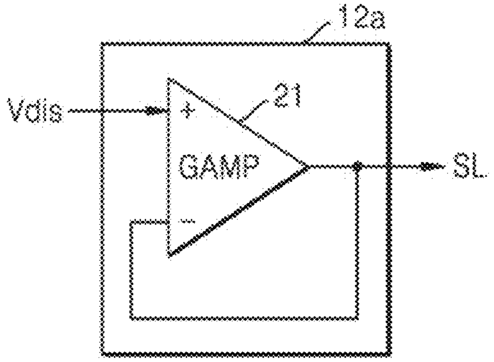
FIGS. 5A, 5B, and 5C illustrate charge/discharge circuits, according to example embodiments.
Figure 5B:
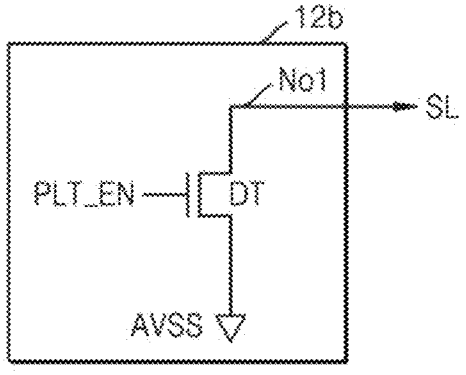
Figure 5C:
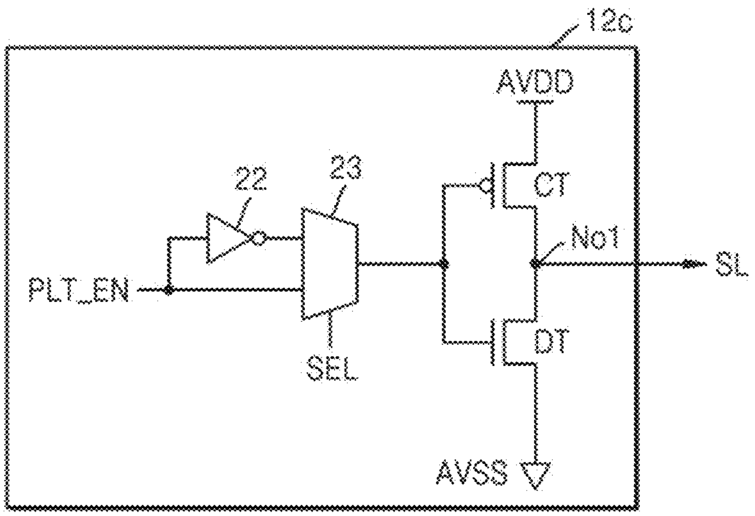

FIGS. 5A to 5C illustrate charge/discharge circuits, according to example embodiments.

Referring to FIG. 5A, a charge/discharge circuit 12*a* may include a buffer 21. The buffer 21 may buffer and output an input voltage Vdis (e.g., a discharge voltage or a charge voltage) applied to a first input terminal (+). The buffer 21 may be implemented as an operational amplifier, and a second input terminal (−) and an output terminal of the operational amplifier may be electrically connected to each other such that the operational amplifier operates as a buffer. In an embodiment, the buffer 21 may be one of a plurality of buffers provided in the grayscale voltage generation circuit 124 of FIG. 3. During a display period, the buffer 21 may be used to generate a grayscale voltage, and during a panel load test period, the buffer 21 may operate as the charge/discharge circuit 12*a*. The buffer 21 may charge or discharge the source line SL based on the input voltage Vdis by providing the input voltage Vdis to the source line SL. In an embodiment, the charge/discharge circuit 12 may include a gamma buffer provided in a gamma voltage generator configured to generate a gamma voltage during a display period.

Referring to FIG. 5B, a charge/discharge circuit 12*b* may include a discharge transistor DT. The discharge transistor DT may be implemented as an N-type transistor. A first terminal of the discharge transistor DT may be connected to an output node No1 of the charge/discharge circuit 12*b*, and a first power supply voltage AVSS may be applied to a second terminal. For example, the first power supply voltage AVSS may be a ground voltage. However, the disclosure is not limited thereto, and the first power supply voltage AVSS may be a positive voltage or a negative voltage. The test enable signal PLT_EN may be applied to a gate terminal of the discharge transistor DT.

The discharge transistor DT may be turned on in response to an active level of the test enable signal, and once the discharge transistor DT is turned on, the discharge transistor DT may provide the first power supply voltage AVSS, for example, a ground voltage, to the source line SL. The source line SL may be discharged through the discharge transistor DT.

Referring to FIG. 5C, a charge/discharge circuit 12*c* may include a discharge transistor DT and a charge transistor CT and may further include a logic configured to control the discharge transistor DT and the charge transistor CT, for example, an inverter 22 and a selector 23. The charge transistor CT may be implemented as a P-type transistor, and the discharge transistor DT may be implemented as an N-type transistor.

A second power supply voltage AVDD may be applied to a first terminal of the charge transistor CT, and a second terminal may be connected to the output node No1. The second power supply voltage AVDD is an analog power supply signal and has a higher voltage level than the first power supply voltage AVSS. The charge transistor CT may be turned on based on a control signal applied to a gate signal and may provide the second power supply voltage AVDD, for example, an analog power supply voltage, to the source line SL. The source line SL may be charged through the charge transistor CT.

A first terminal of the discharge transistor DT may be connected to the output node No1 of the charge/discharge circuit 12*b*, and a second terminal may be connected to the first power supply voltage AVSS. An operation of the discharge transistor DT may be the same as that described with reference to FIG. 5B, and thus, a repeated description thereof will be omitted.

A control signal generated based on the test enable signal PLT_EN may be applied to the gate terminals of the charge transistor CT and the discharge transistor DT.

The inverter 22 may generate a test enable bar signal by inverting a phase of the test enable signal PLT_EN. The selector 23 may receive the test enable signal PLT_EN and the test enable bar signal and may select one of the test enable signal and the test enable bar signal in response to a selection signal SEL. For example, when the charge/discharge circuit 12*c* operates as a discharge circuit, the selector 23 may output the test enable signal PLT_EN, and the discharge transistor DT may be turned on in response to the test enable signal PLT_EN. When the charge/discharge circuit 12*c* operates as a charge circuit, the selector 23 may output the test enable bar signal, and the charge transistor CT may be turned on in response to the test enable bar signal.

In an embodiment, in order to prevent the charge transistor CT and the discharge transistor DT from being simultaneously turned on, different control signals generated based on the test enable signal PLT_EN may be respectively applied to the gate terminal of the charge transistor CT and the gate terminal of the discharge transistor DT.

Figure 6A:
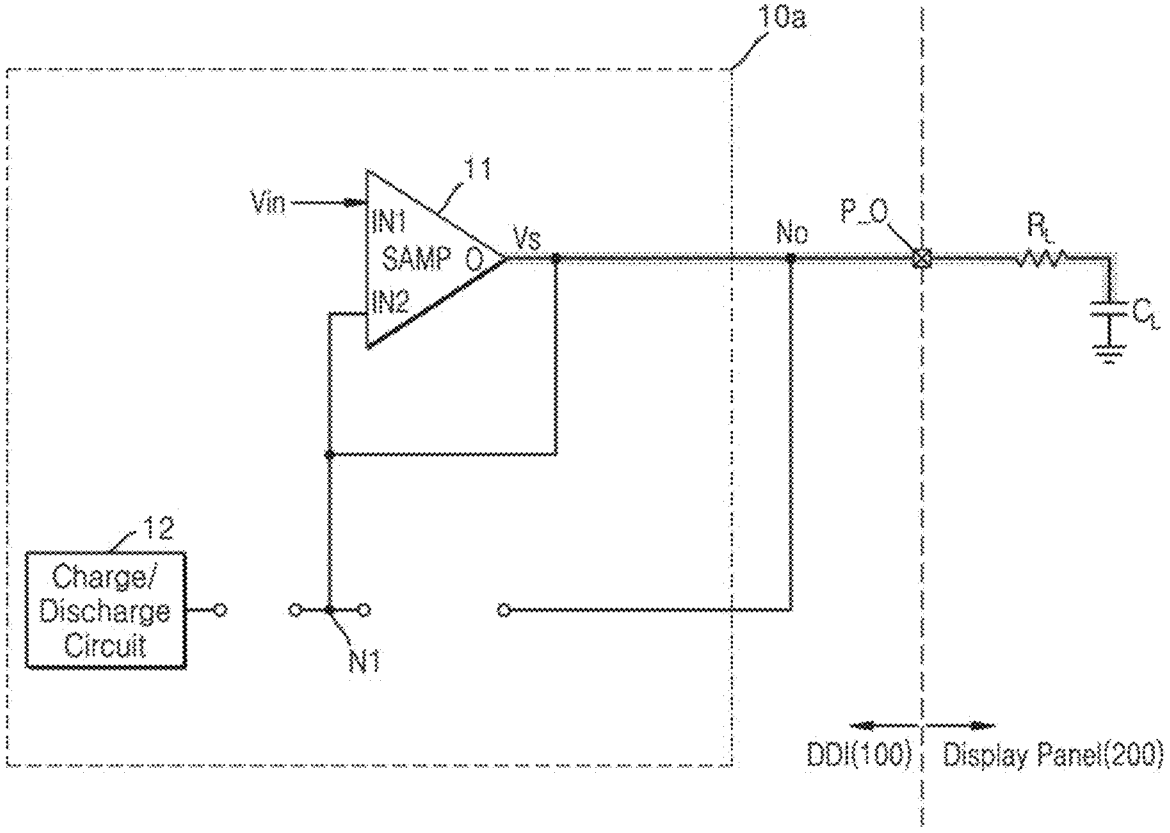
FIGS. 6A and 6B illustrate an operation of a panel load detection circuit, according to one or more example embodiments.
Figure 6B:
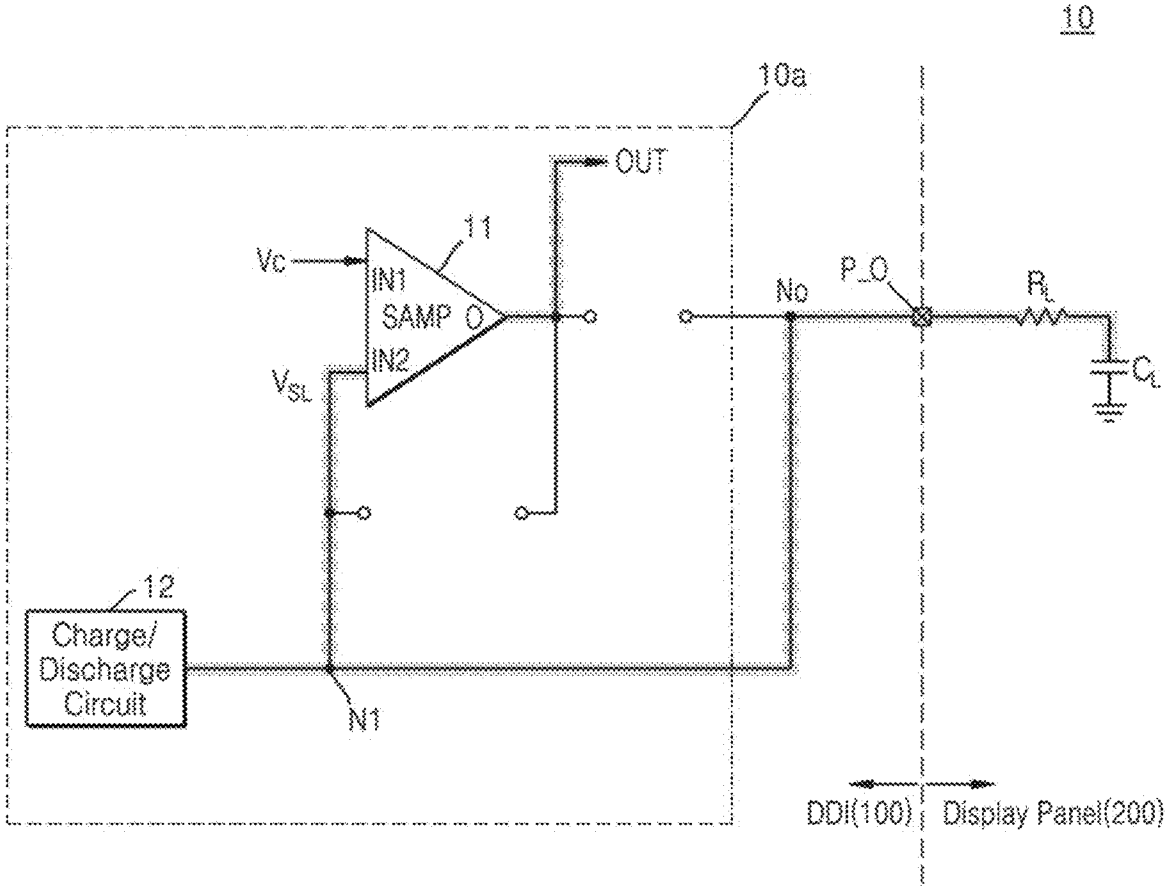

FIGS. 6A and 6B illustrate operations of a first phase and a second phase of the panel load detection circuit 10*a*, according to one or more example embodiments.

Referring to FIG. 4A and FIG. 6A together, in a first phase of a test period, the first switch SW1 and the second switch SW2 may be turned on, and the third switch SW3 and the fourth switch SW4 may be turned off. The output terminal O and the second input terminal IN2 of the source amplifier 11 may be connected, and the output terminal O of the source amplifier 11 may be connected to the output node No. The source amplifier 11 may operate as a unity gain buffer. The source amplifier 11 may buffer an input voltage Vin applied to the first input terminal IN1, and may output a source voltage Vs corresponding to the input voltage Vin to the source line SL. In an embodiment, the input voltage V1 may be a charging reference voltage (or a discharging reference voltage) provided to charge (or discharge) the source line SL to a certain level. The source amplifier 11 may charge (or discharge) the source line SL based on the source voltage Vs.

Referring to FIG. 4A and FIG. 6B together, in a second phase of the test period, the first switch SW1 and the second switch SW2 may be turned off, and the third switch SW3 and the fourth switch SW4 may be turned on. The charge/discharge circuit 12 and the second input terminal IN2 of the source amplifier 11 may be connected to the output node No.

The charge/discharge circuit 12 may charge (or discharge) the source line SL. As described with reference to FIGS. 5A to 5C, the charge/discharge circuit 12 may charge (or discharge) the source line SL based on a charge/discharge voltage, for example, the received input voltage Vdis or the first and second power supply voltages AVSS and AVDD.

The source amplifier 11 may operate as a comparator, and may compare a comparison voltage Vc applied to the first input terminal IN1 with a voltage $V_{SL}$ (hereinafter, referred to as a source line voltage) of the source line SL received at the second input terminal IN2 and may output the comparison result signal OUT.

In an embodiment, the comparison voltage Vc may be lower than the input voltage Vi and may be higher than a discharge voltage provided from the charge/discharge circuit 12. As the source line SL is discharged based on the discharge voltage provided from the charge/discharge circuit 12, the source line voltage $V_{SL}$ may decrease from a voltage level of the input voltage Vi to a voltage level of the discharge voltage. When the source line voltage $V_{SL}$ is higher than the comparison voltage Vc, the source amplifier 11 may output the comparison result signal OUT at a first level, and when the source line voltage $V_{SL}$ is equal to or lower than the comparison result Vc, the source amplifier 11 may output the comparison result signal OUT at a second level.

Figure 7:
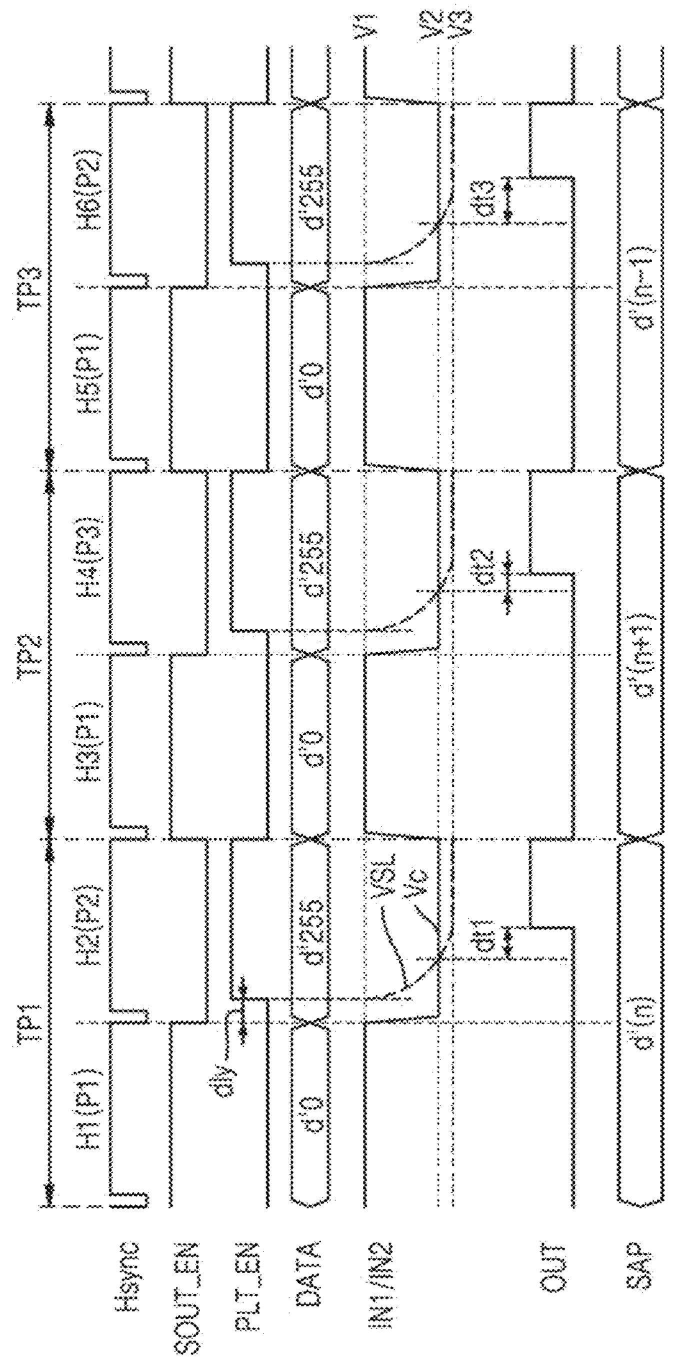
FIG. 7 is a timing diagram illustrating a panel load detection circuit, according to one or more example embodiments.

FIG. 7 is a timing diagram illustrating an operation of a panel load detection circuit, according to one or more example embodiments. The following will be described with reference to the panel load detection circuit 10*a* of FIG. 4A.

Referring to FIG. 7, a plurality of test periods (e.g., first to third test periods TP1, TP2, and TP3) of a panel load test period and first and second phases P1 and P2 may be distinguished based on the horizontal synchronization signal Hsync, for example, a falling edge of the horizontal synchronization signal Hsync. First, third, and fifth horizontal periods H1, H3, and H5 correspond to the first phase P1, and second, fourth, and sixth horizontal periods H2, H4, and H4 correspond to the second phase P2.

In the first phase P1, the output enable signal SOUT_EN is at an active level (e.g., logic high), and the test enable signal PLT_EN is at an inactive level (e.g., logic low). The first switch SW1 and the second switch SW2 may be turned on such that the source amplifier 11 operates as a unity gain buffer.

In the second phase P2, the output enable signal SOUT_EN may be at an inactive level (e.g., logic low), and the test enable signal PLT_EN may be at an active level (e.g., logic high). The source amplifier 11 may operate as a comparator. The charge/discharge circuit 12 may be connected to the source line SL.

In order to prevent the output terminal O of the source amplifier 11 and the charge/discharge circuit 12 from being simultaneously connected to the output node No, in the second phase P2, the output enable signal SOUT_EN may transition from an active level to an inactive level, a certain delay dly may occur after transitioning of the output enable signal SOUT_EN, and then the test enable signal PLT_EN may transition from an inactive level to an active level.

A voltage corresponding to data DATA may be applied to the first input terminal IN1 of the source amplifier 11. The data DATA indicates steps of a voltage level that the source amplifier 11 may output. For example, a voltage level of a voltage output from the source amplifier 11 may be divided into 256 steps, and d'0 indicates a highest level and d'255 indicates a lowest level. For example, the source amplifier may operate based on the first power supply voltage AVSS and the second power supply voltage AVDD which are high, and a voltage level corresponding to d'0 may be closest to the second power supply voltage AVDD and a voltage level corresponding to d'255 may be closest to the first power supply voltage AVSS.

In the first phase P1, the input voltage Vin corresponding to d'0 may be applied to the first input terminal IN1 of the source amplifier 11, and in the second phase P2, the comparison voltage Vc corresponding to d'255 may be applied to the first input terminal IN1. In an embodiment, the data DATA corresponding to the first phase P1 and the second phase P2 may be set to different values. For example, the data DATA applied to the first phase P may be d'0, and the data DATA applied to the second phase P2 may be d'127.

In the first phase P1, the source amplifier 11 may generate the source voltage Vs based on the input voltage Vin corresponding to d'0, for example, a first voltage V1, and may provide the source voltage Vs to the source line SL such that the source line SL is charged to the first voltage V1. In the second phase P2, the comparison voltage Vc corresponding to d'255, for example, a second voltage V2, may be applied to the first input terminal IN1 of the source amplifier 11, and the source line voltage $V_{SL}$ may be applied to the second input terminal IN2 of the source amplifier 11. The charge/discharge circuit 12 may discharge the source line SL based on a third voltage V3, for example, an input voltage of the charge/discharge circuit 12 or the first power supply voltage AVSS, and the source line voltage $V_{SL}$ may decrease from a level of the first voltage V1 to a level of the third voltage V3.

In the second phase, the source amplifier 11 may compare the comparison voltage Vc with the source line voltage $V_{SL}$ and may generate the comparison result signal OUT. When the source line voltage $V_{SL}$ is higher than the comparison result Vc, the comparison result signal OUT may be at a first level, for example, logic low, and when the source line voltage $V_{SL}$ is equal to or lower than the comparison voltage Vc, the comparison result signal OUT may transition to a second level, for example, logic high. However, due to a time required for a comparison operation of the source amplifier 11, the comparison result signal OUT may transition from the first level to the second level after a delay time according to the comparison operation from a time point when the source line voltage $V_{SL}$ is equal to the comparison voltage Vc.

The delay time according to the comparison operation may vary according to a bias current of the source amplifier 11, in other words, a comparator. For example, as shown in FIG. 7, during the first test period TP1, a value of the bias control signal SAP may be set to d'(n); during the second test period TP2, a value of the bias control signal SAP may be set to d'(n+1); and during the third test period TP3, a value of the bias control signal SAP may be set to d'(n−1). During the second test period TP2, the bias current of the source amplifier 11 may be the largest, and during the third test period TP3, the bias current of the source amplifier 11 may be the smallest. Accordingly, a delay time dt2 according to a comparison operation of the second test period TP2 may be shorter than a delay time dt1 according to a comparison operation of the first test period TP1, and a delay time dt3 according to a comparison operation of the third test period TP3 may be longer than the delay time dt1 according to the comparison operation of the first test period TP1.

Figure 8:
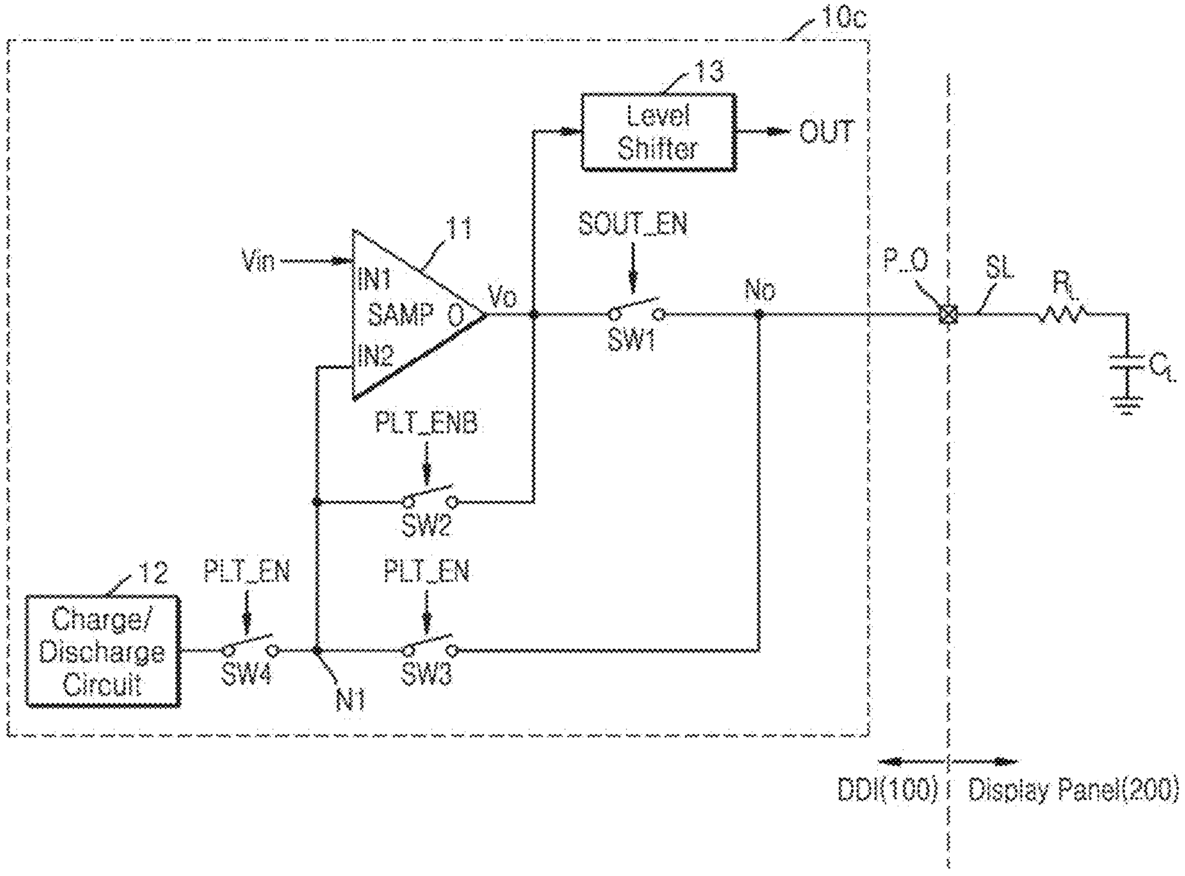
FIG. 8 illustrates a panel load detection circuit, according to one or more example embodiments.

FIG. 8 illustrates a panel load detection circuit, according to one or more example embodiments.

Referring to FIG. 8, a panel load detection circuit 10*c* may include the source amplifier 11, the charge/discharge circuit 12, a level shifter 13, and the plurality of switches, for example, the first to fourth switches SW1 to SW4. When the panel load detection circuit 10*c* is compared with the panel load detection circuit 10*a* of FIG. 4A, the panel load detection circuit 10*c* may further include the level shifter 13.

The level shifter 13 may level shift an analog level of an output voltage of a comparator, that is, the source amplifier 11, for example, the comparison result signal OUT, to a digital level. The comparison result signal OUT may be used in the control logic 20 (see FIG. 1), and the control logic 20 may process digital signals of the comparison result signal OUT. When the source amplifier 11 operates as a comparator, levels of the comparison result signal OUT may correspond to power supply voltages of the source amplifier 11 and may be analog levels. A voltage range of an analog level may be wider than a voltage range of a digital level. For example, a second level (e.g., logic high) at an analog level may have a higher voltage level than a second level at a digital level. The level shifter 13 may level shift an analog level of the comparison result signal OUT to a digital level such that the comparison result signal OUT is used in the control logic 20.

Figure 9:
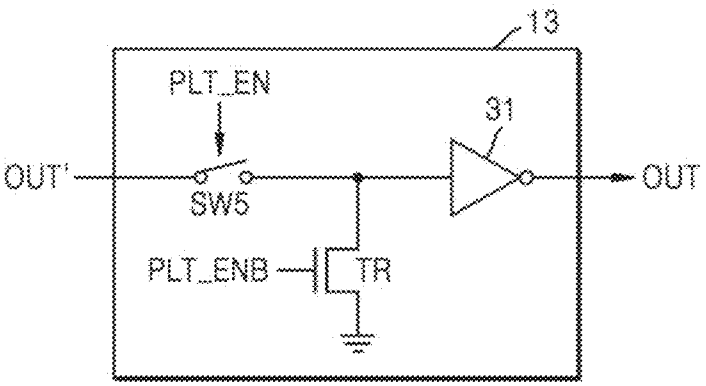
FIG. 9 illustrates a level shifter, according to one or more example embodiments.

FIG. 9 illustrates a level shifter, according to one or more example embodiments. Referring to FIG. 9, the level shifter 13 may include an inverter 31, a transistor TR, and a fifth switch SW5. The transistor TR may be implemented as an N-type MOSFET, and the fifth switch SW5 may be implemented as a transmission gate.

The fifth switch SW5 may be turned on or turned off in response to the test enable signal PLT_EN, and once the fifth switch SW5 is turned on, the fifth switch SW5 may provide an output of the source amplifier 11, that is, a comparison result signal OUT' of an analog level, to an input terminal of the inverter 31.

The transistor TR may be turned on or turned off in response to the test enable bar signal PLT_ENB. The transistor TR and the fifth switch SW5 may complementarily operate. When the fifth switch SW5 is turned on to provide the comparison result signal OUT' to the input terminal of the inverter 31, the transistor TR may be turned off. When the fifth transistor SW5 is turned off, the transistor TR may be turned on to ground the input terminal of the inverter 31. The transistor TR may prevent the input terminal of the inverter 31 from floating.

The inverter 31 may operate based on power supply voltages of a digital level and may convert the comparison result signal OUT' of an analog level into the comparison result signal OUT of a digital level. Although one inverter 31 is illustrated in FIG. 9, the disclosure is not limited thereto and the level shifter 13 may include a plurality of inverters 31. For example, the level shifter 13 may include two inverters 31, and may output the comparison result signal OUT of a digital level having the same phase as the comparison result signal OUT' of an analog level.

Figure 10:
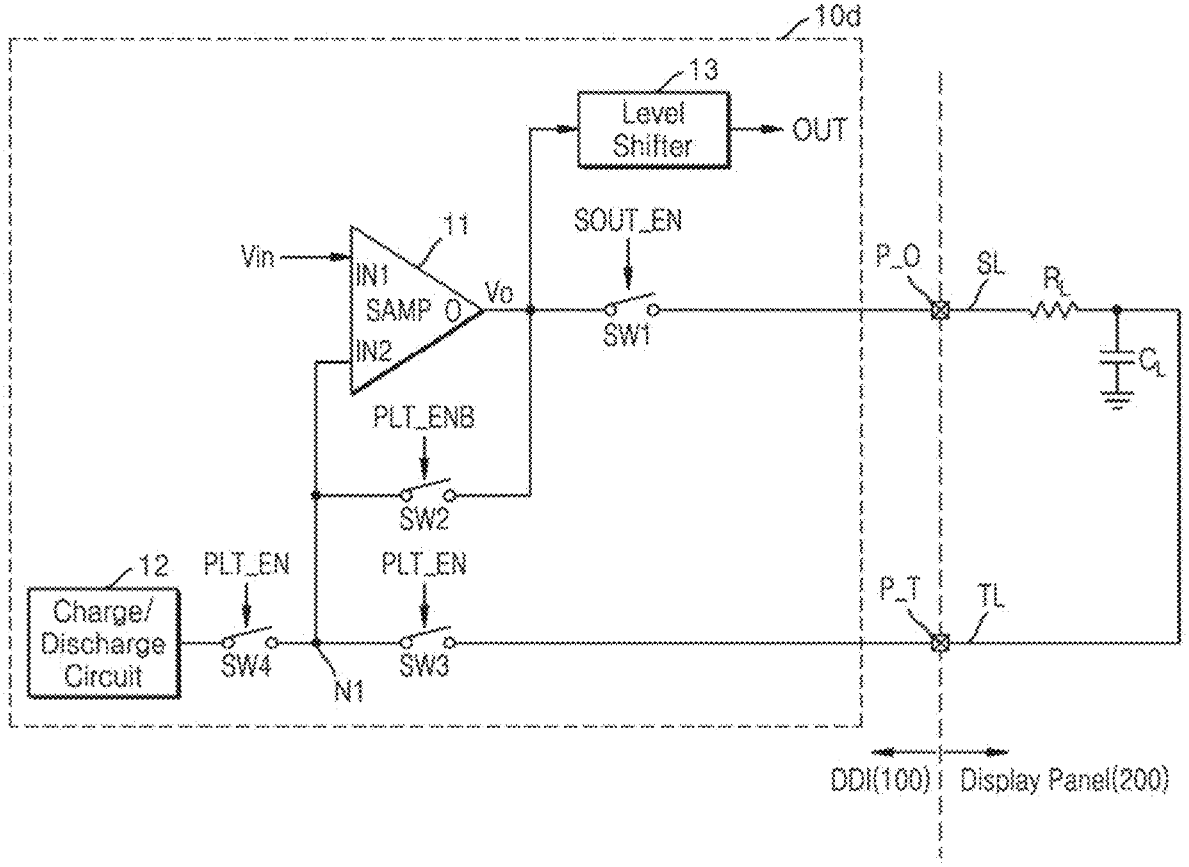
FIG. 10 illustrates a panel load detection circuit, according to one or more example embodiments.

FIG. 10 illustrates a panel load detection circuit, according to one or more example embodiments. FIG. 10 is a modified example of the panel load detection circuit 10*c* of FIG. 8, and thus, a repeated description will be omitted.

Referring to FIG. 10, the display driving circuit 100 may include a test pad P_T, and the test pad P_T may be electrically connected to the source line SL through a test line TL patterned on the display panel 200. The third switch SW3 of a panel load detection circuit 10*d* may be connected to the first node N1 and the test pad P_T. In a second phase of a test period, when the third switch SW3 and the fourth switch SW4 are turned on, the charge/discharge circuit 12 may be electrically connected to the source line SL through the test pad P_T to discharge the source line SL.

Figure 11A:
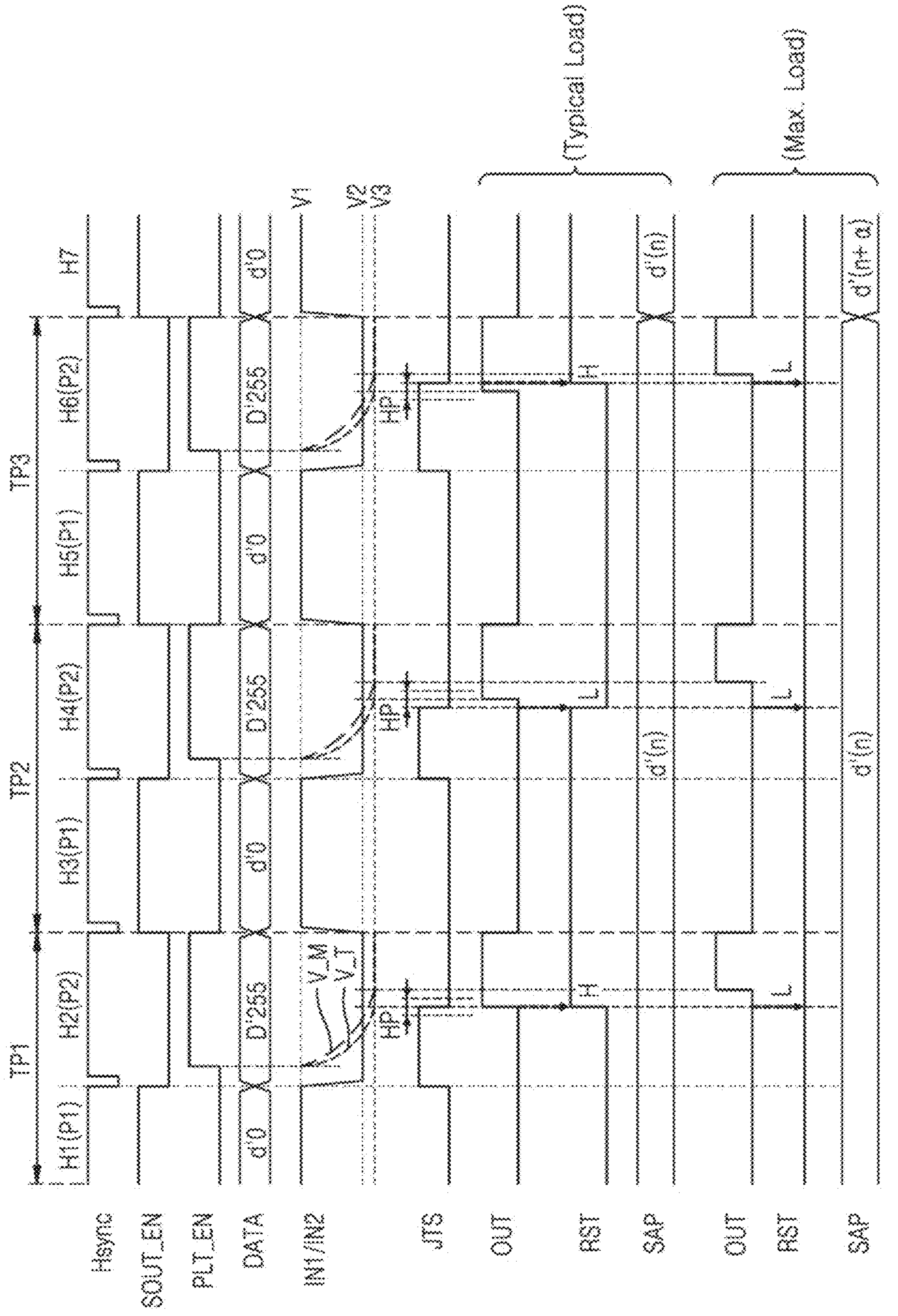
FIGS. 11A and 11B are timing diagrams illustrating a method of adjusting bias current, according to one or more example embodiments.
Figure 11B:
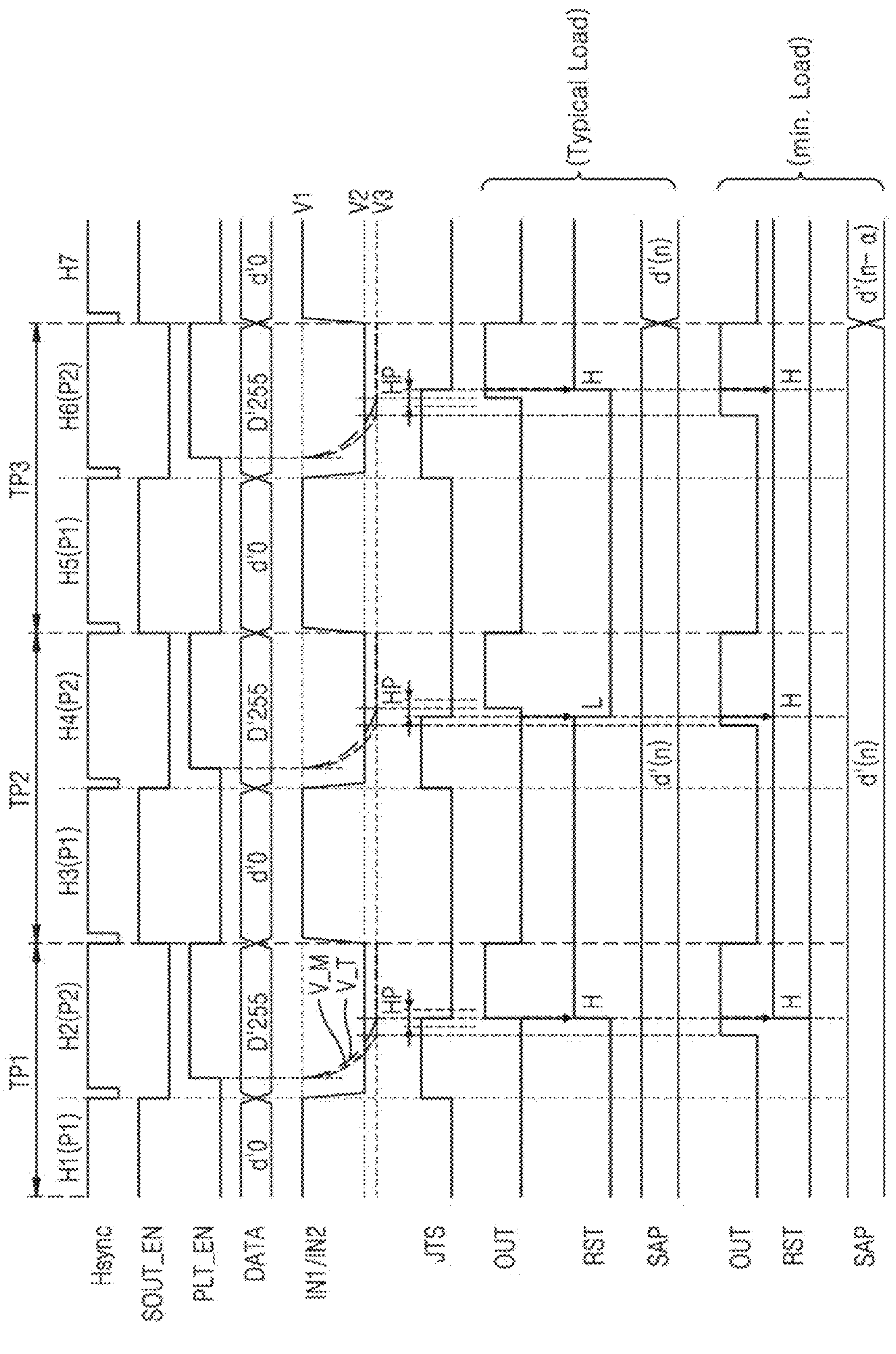

FIGS. 11A and 11B are timing diagrams illustrating a method of adjusting bias a current, according to one or more example embodiments. FIGS. 11A and 11B illustrate a method in which the control logic 20 (see FIG. 1) adjusts the bias control signal SAP according to a panel load based on the comparison result signal OUT output from a panel load detection circuit.

Referring to FIG. 11A, the control logic 20 may obtain levels of the comparison result signal OUT during the first to third test periods TP1, TP2, and TP3 based on a determination timing signal JTS indicating a determination time point. For example, as shown in FIG. 11A, a falling edge of the determination timing signal JTS may indicate a determination time point, and the control logic 20 may obtain a level of the comparison result signal OUT at the falling edge of the determination timing signal JTS. In other words, the control logic 20 may determine whether the comparison result signal OUT is at a first level (e.g., logic low) or a second level (e.g., logic high) at the falling edge of the determination timing signal JTS.

The determination timing signal JTS may be set based on a plurality of bits of a determination time point setting register and a plurality of bits of a hysteresis interval setting register. The determination time point setting register may indicate a determination reference time point, and the hysteresis interval setting register may indicate a hysteresis interval HP by which a determination time point may vary with respect to the determination reference time point. The determination reference time point may indicate a time point when a comparison result signal is expected to transition from a first level to a second level when a panel load is a typical load.

Default values of a bias setting register, the determination time point setting register, and the hysteresis interval setting register may be set based on when a panel load is a typical load according to a panel load distribution, and the default values may be respectively stored in the bias setting register, the determination time point setting register, and the hysteresis interval setting register in a manufacturing stage of the display driving circuit 100 (see FIG. 1).

The bias setting signal SAP according to a panel load test period may be set to d'(n) (n is an integer of 1 or more) according to the default value of the bias setting register. During each test period, a time point of a falling edge of the determination timing signal JTS, in other words, a determination time point, may be differently set. The control logic 20 may determine the comparison result signal OUT at a first determination time point during the first test period TP1, may determine the comparison result signal OUT at a second determination time point during the second test period TP2, and may determine the comparison result signal OUT at a third determination time point during the third test period TP3. The first determination time point may be the determination reference time point, the second determination time point may be an earliest time point within the hysteresis interval HP based on the determination reference time point, and the third determination time point may be a latest time point within the hysteresis interval HP based on the determination reference time point. Thus, a position of the second determination time point in the second test period TP2 may be earlier than a position of the first determination time point in the first test period TP1, and a position of the third determination time point in the third test period TP3 may be later than a position of the first determination time point in the first test period TP1.

The control logic 20 may determine whether a panel load is a typical load, a maximum load, or a minimum load based on a combination of determination results RST of the first to third test periods TP1, TP2, and TP3, in other words, levels of the comparison result signal OUT.

When the determination results RST during one or two periods of the first to third test periods TP1, TP2, and TP3 are logic high H, the control logic 20 may determine that a panel load is a typical load.

For example, as shown in FIG. 11A, when the determination results RST of the first to third test periods TP1, TP2, and TP3 are respectively logic high H, logic low L, and logic high H, the control logic 20 may determine that a panel load is a typical load. The control logic 20 may maintain the bias setting signal SAP at d'(n) that is a default value. The bias setting signal SAP may be applied to a display period during which the display apparatus 1 (see FIG. 1) performs a display operation. During the display period, a bias current of the plurality of source amplifiers 11 (see FIG. 3) may be controlled based on the bias setting signal SAP of d'(n).

When all of the determination results RST of the first to third test periods TP1, TP2, and TP3 are logic low L, the control logic 20 may determine that a panel load is a maximum load. The term "maximum load" means that a panel load exceeds a range in which a load is determined to be a typical load.

As shown in FIG. 11A, a voltage of the second input terminal IN2 of the source amplifier 11 (see FIG. 4A), for example, a source line voltage, may decrease from a level of the first voltage V1 to a level of the third voltage V3, and a decreasing rate of a voltage V_M of the second input terminal when a load is a maximum load is slower than a decreasing rate of a voltage V_T of the second input terminal when a load is a typical load. Accordingly, a time point when the comparison result signal OUT transitions from a first level (e.g., logic low) to a second level (e.g., logic high) when a load is a maximum load may be later than a time point when the comparison result signal OUT transitions from the first level to the second level when a load is a typical load. Accordingly, all of the determination results RST of the first to third test periods TP1, TP2, and TP3 may be logic low L.

When it is determined that a panel load is a maximum load, the control logic 20 may increase the bias setting signal SAP. For example, the control logic 20 may set the bias setting signal SAP to d'(n+α) (α is an integer of 1 or more) higher than d'(n) that is a default value.

When all of the determination results RST of the first to third test periods TP1, TP2, and TP3 are logic high H, the control logic 20 may determine that a panel load is a minimum load. The term "minimum load" means that a panel load is less than a load within a range in which a load is determined to be a typical load.

As shown in FIG. 11B, a decreasing rate of a voltage V_m of the second input terminal when a panel load is a minimum load is faster than a decreasing rate of the voltage V_T of the second input terminal when a load is a typical load.

Accordingly, a time point when the comparison result signal OUT transitions from a first level (e.g., logic low) to a second level (e.g., logic high) when a load is a minimum load may be earlier than a time point when the comparison result signal OUT transitions from the first level to the second level when a load is a typical load. Accordingly, all of the determination results RST of the first to third test periods TP1, TP2, and TP3 may be logic high H.

When it is determined that a panel load is a minimum load, the control logic 20 may reduce the bias setting signal SAP. For example, the control logic 20 may set (or change) the bias setting signal SAP to d'(n−α) (α is an integer of 1 or more) lower than d'(n) that is a default value.

As described with reference to FIGS. 11A and 11B, during a plurality of test periods, the control logic 20 may fix the bias control signal SAP, may vary a determination time point, and may adjust the bias control signal SAP based on the determination results RST obtained during the plurality of test periods.

Figure 12:
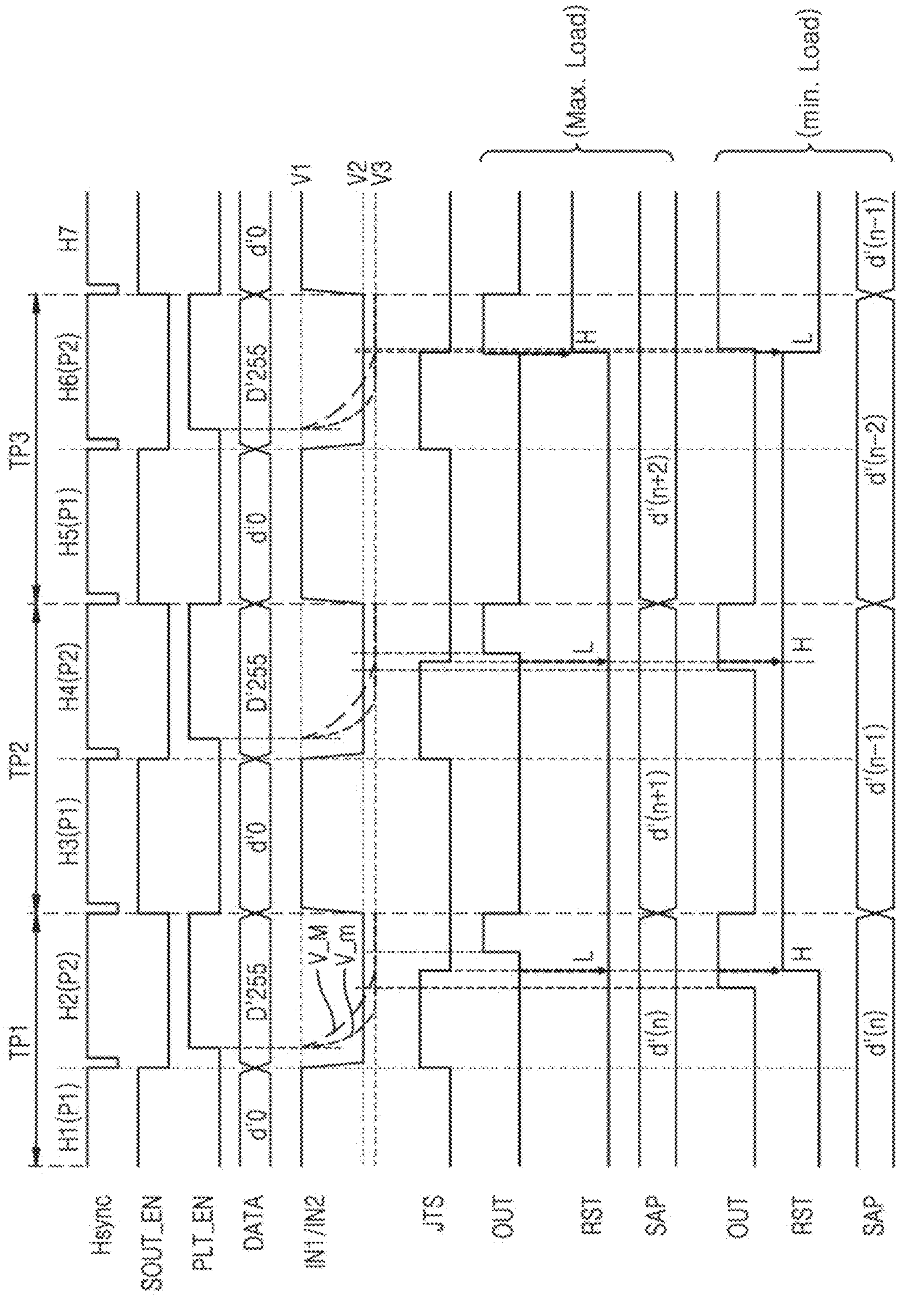
FIG. 12 is a timing diagram illustrating a method of adjusting bias current, according to one or more example embodiments.

FIG. 12 is a timing diagram illustrating a method of adjusting a bias current, according to one or more example embodiments. FIGS. 11A and 11B illustrate a method in which the control logic 20 (see FIG. 1) adjusts the bias control signal SAP according to a panel load based on the comparison result signal OUT output from a panel load detection circuit.

Referring to FIG. 12, during each test period, a determination time point may be fixed and the bias setting signal SAP may be changed. The determination time point may be fixed to a first time point based on a default value of a determination time point setting register.

During the first test period TP1, the bias setting signal SAP may be set to d'(n) based on a default value of a bias setting register. When a panel load is a typical load, the determination result RST is expected to be logic high H.

When a panel load is a maximum load, because a time point when the comparison result signal OUT transitions from a first level to a second level is later than that when a panel load is a typical load, the determination result RST of the first test period TP1 is logic low L. The control logic 20 may increase the bias setting signal SAP to d'(n+1).

Because the bias setting signal SAP is increased to d'(n+1) during the second test period TP2, a time required for a comparison operation of a comparator, in other words, the source amplifier 11, may be reduced. Accordingly, a time point when the comparison result signal OUT transitions may be earlier than that in the first test period TP1. However, because the determination time point is earlier than the time point when the comparison result signal OUT transitions, the determination result RST may be logic low L. The control logic 20 may increase the bias setting signal SAP to d'(n+2).

Because the bias setting signal SAP is increased to d'(n+2) during the third test period TP3, a time point when the comparison result signal OUT transitions may be earlier than that in the second test period TP2. The time point when the comparison result signal OUT transitions may be earlier than the determination time point, and the determination result RST may be logic high H. The control logic 20 may set the bias setting signal SAP to d'(n+2). During a display period, bias current of the source amplifier 11 may be set based on the bias setting signal SAP of d'(n+2).

When a panel load is a minimum load, because a time point when the comparison result signal OUT transitions from a first level to a second level is earlier than that when a panel load is a typical load, the determination result RST of the first test period TP1 is logic high H. The control logic 20 may decrease the bias setting signal SAP to d'(n−1).

Because the bias setting signal SAP is reduced to d'(n−1) during the second test period TP2, a time required for a comparison operation of a compactor, in other words, the source amplifier 11, may be increased. Accordingly, a time point when the comparison result signal OUT may be later than that in the first test period TP1. However, because the time point when the comparison result signal OUT transitions is earlier than the determination time point, the determination result RST may be logic high H. The control logic 20 may reduce the bias setting signal SAP to d'(n−2).

Because the bias setting signal SAP is reduced to d'(n−2) during the third test period TP3, a time point when the comparison result signal OUT transitions may be later than that in the second test period TP2. The time point when the comparison result signal OUT transitions may be later than the determination time point, and the determination result RST may be logic low L. The control logic 20 may set the bias setting signal SAP to d'(n−1) that is higher than d'(n−2). During a display period, bias current of the source amplifier 11 may be set based on the bias setting signal SAP of d'(n−1).

When a panel load is a typical load, the determination result RST may be logic low L during the second test period TP2 in which the bias setting signal SAP is set to d'(n−1). The control logic 20 may set the bias setting signal SAP to d'(n) that is higher than d'(n−1). That is, when a load is a typical load, the bias setting signal SAP may maintain a default value.

As described above with reference to FIG. 12, during a plurality of test periods, the control logic 20 may obtain the determination results RST by fixing a determination time point and changing the bias control signal SAP and may adjust the bias control signal SAP based on the determination results RST of the plurality of test periods.

Figure 13:
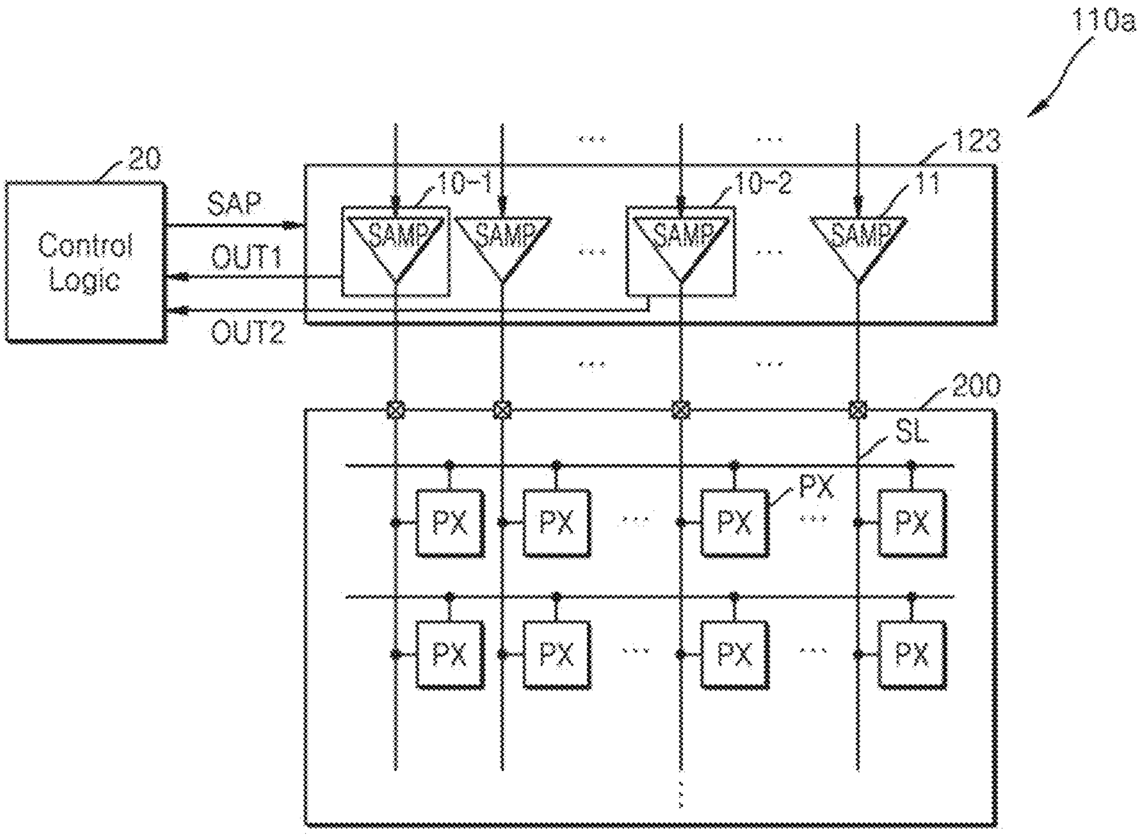
FIG. 13 illustrates a source driver, according to one or more example embodiments.

FIG. 13 illustrates a source driver, according to one or more example embodiments. Referring to FIG. 13, a source driver 110*a* may include a buffer unit 123 and a plurality of panel load detection circuits 10-1 and 10-2. The source driver 110*a* may further include other components of the source driver 110 of FIG. 3, and may include three or more panel load detection circuits.

The first panel load detection circuit 10-1 may include one of a plurality of source amplifiers 11, and the second panel load detection circuit 10-2 may include another one of the plurality of source amplifiers 11. As described above, a source amplifier included in a panel load detection circuit may operate as a comparator during a panel load test period, and may output a comparison result signal.

The first panel load detection circuit 10-1 may output a first comparison result signal OUT1, and the second panel load detection circuit 10-2 may output a second comparison result signal OUT2. The control logic 20 may adjust a bias current of the plurality of source amplifiers 11 according to a panel load by adjusting the bias control signal SAP based on the first and second comparison result signals OUT1 and OUT2.

Figure 14:
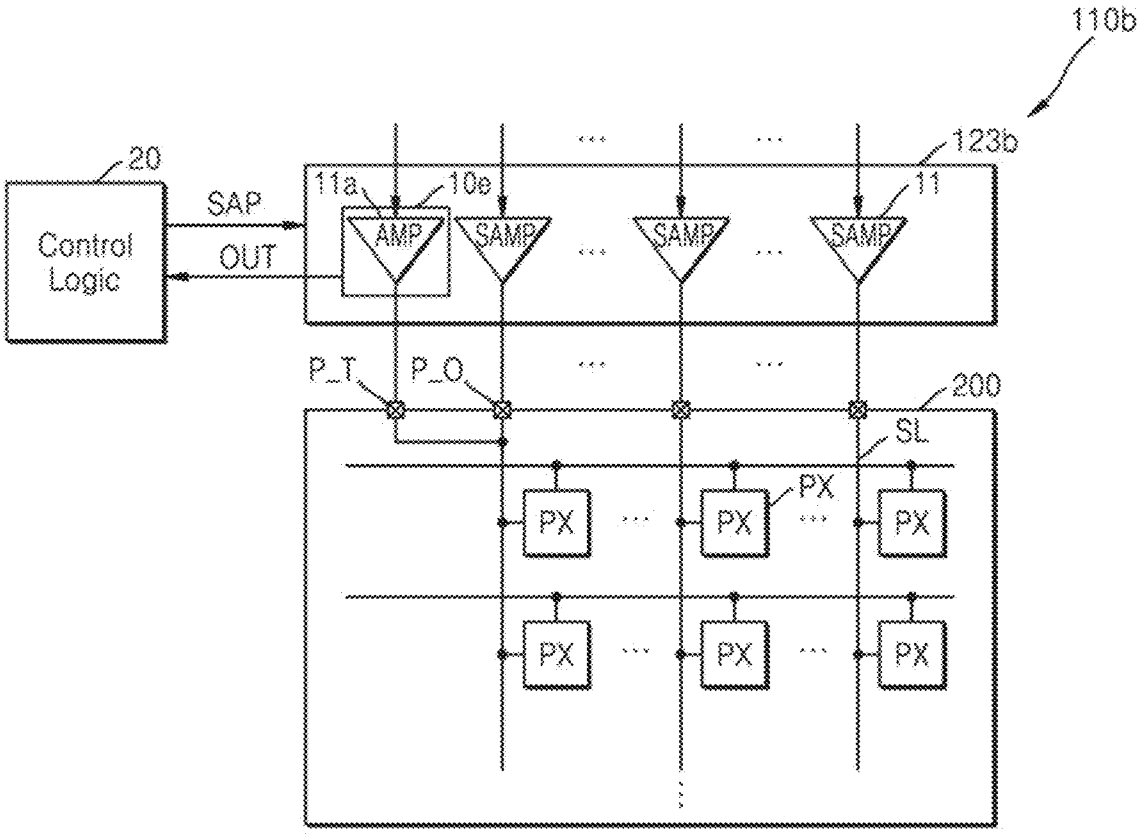
FIG. 14 illustrates a source driver, according to one or more example embodiments.

FIG. 14 illustrates a source driver, according to one or more example embodiments. Referring to FIG. 14, a source driver 110*b* may include a buffer unit 123*b* and a panel load detection circuit 10*e*. The source driver 110*b* may further include other components of the source driver 110 of FIG. 3.

The panel load detection circuit 10*e* may include an operational amplifier 11*a* separate from the source amplifier 11, and the operational amplifier 11*a* may be connected to the source line SL during a panel load test period to charge (or discharge) the source line SL and may operate as a comparator.

The panel load detection circuit 10*e* may be connected to one source line SL from among a plurality of source lines SL through the test pad P_T.

Figure 15:
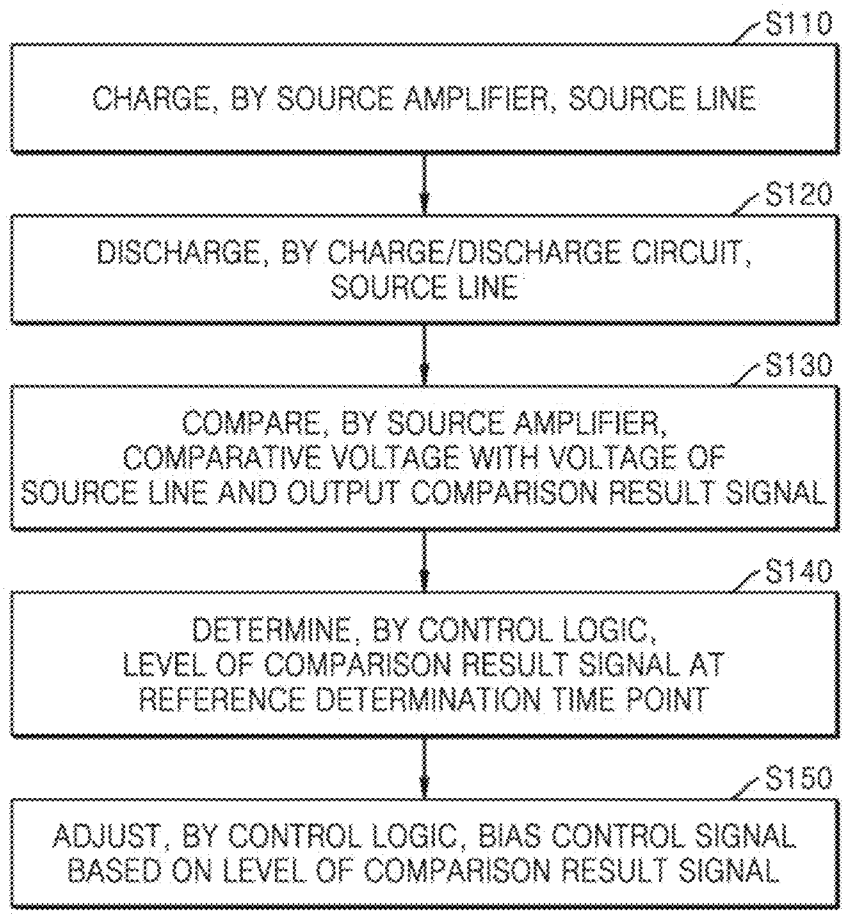
FIG. 15 is a flowchart illustrating a method of adjusting bias current of a display driving circuit, according to one or more example embodiments.

FIG. 15 is a flowchart illustrating a method of adjusting bias current of a display driving circuit, according to one or more example embodiments. The method of FIG. 15 may be performed in a test stage for setting or resetting setting values of the display driving circuit 100 (see FIG. 1) during a manufacturing stage or a usage stage of the display apparatus 1 (see FIG. 1). The method of FIG. 15 may be performed by the display driving circuit 100 of FIG. 1 and the source driver 110 of FIG. 3, and the above descriptions provided with reference to FIGS. 1-14 may apply to the present embodiment.

Referring to FIGS. 3 and 15 together, the source amplifier 11 may charge the source line SL (S110). In a first phase of a test period, the source amplifier 11 may operate as a unity gain buffer and may charge the source line SL by providing a first voltage corresponding to a received input voltage to the source line SL.

Net, a charge/discharge circuit 12 may discharge the source line SL (S120). In a second phase of the test period, the charge/discharge circuit 12 may be connected to the source line SL and may discharge the source line SL by providing a second voltage, lower than the first voltage, to the source line SL.

The source amplifier 11 may compare a comparison voltage with a source line voltage and may output a comparison result signal (S130). In the second phase of the test period, the source amplifier 11 may operate as a comparator and may compare a comparison voltage received by a first input terminal with a source line voltage received by a second input terminal. The comparison voltage is lower than the first voltage. When the source line voltage is higher than the comparison voltage, the comparison result signal at a first level may be output. As the source line is discharged according to operation S120, the source line voltage may decrease, and when the source line voltage is equal to or lower than the comparison voltage, the source amplifier 11 may output the comparison result signal OUT at a second level.

The control logic 20 may receive the comparison result signal, and may determine (or obtain) a level of the comparison result signal at a determination time point (S140).

The control logic 20 may adjust the bias control signal SAP based on the level of the comparison result signal. As the bias control signal SAP increases or decrease, a bias current of the source amplifier may increase or decrease such that a slew rate of the source amplifier is controlled. The control logic 20 may maintain a value of the bias control signal SAP as a default value or may increase or reduce the value of the bias control signal SAP.

In an embodiment, operations S110 to S140 may be repeatedly performed during a plurality of test periods, and in this case, as described with reference to FIGS. 11A to 12, a value of the bias control signal SAP may be changed or a determination time point may be changed during the plurality of test periods. The control logic 20 may determine that a panel load is a typical load, a maximum load, or a minimum load based on levels of a comparison result signal determined during the plurality of test periods, and may adjust a value of the bias control signal SAP according to the panel load. When it is determined that a panel load is a typical load, the control logic 20 may maintain the bias control signal SAP at a default value; when it is determined that a panel load is a maximum load, the control logic 20 may increase the bias control signal SAP by a preset value or stepwise; and when it is determined that a panel load is a minimum load, the control logic 20 may reduce the bias control signal SAP by a preset value or stepwise.

As such, a display driving circuit according to one or more example embodiments may optimize a bias setting of a source amplifier according to a panel load of a display panel. Accordingly, power consumption of the display driving circuit may be optimized and the yield of the display panel may be improved.

Figure 16:
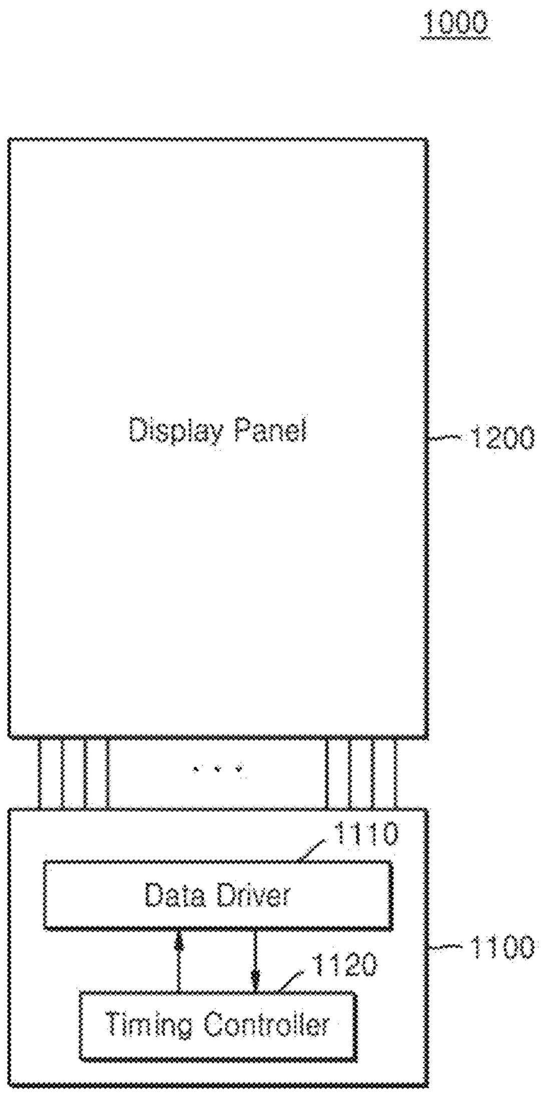
FIG. 16 illustrates an example of a display apparatus, according to one or more example embodiments.

FIG. 16 illustrates an example of a display apparatus, according to one or more example embodiments. A display apparatus 1000 of FIG. 16 may include a display panel 122 having a small size and may be applied to a mobile device such as a smartphone or a tablet PC.

Referring to FIG. 16, the display apparatus 1000 may include a display driving circuit 1100 and a display panel 1200. The display driving circuit 1100 may include one or more ICs, and may be mounted on a circuit film such as a tape carrier package (TCP), a chip on film (COF), or a flexible print circuit (FPC) and attached to the display panel 1200 by using a tape automatic bonding (TAB) method, or may be mounted on a non-display area (e.g., an area where an image is not displayed) of the display panel 1200 by using a chip on glass (COG) method.

The display driving circuit 1100 may include a source driver 1110 and a timing controller 1120, and may further include a gate driver. In an embodiment, the gate driver may be mounted on the display panel 1200.

As described with reference to FIGS. 1 to 15, the timing controller 1120 may include the control logic 20 (see FIG. 1), and the source driver 1110 may include the panel load detection circuit 10 (see FIG. 1). During a panel load test period, when a source line of the display panel 1200 is charged or discharged, the panel load detection circuit 10 may compare a voltage of the source line indicating a charging or discharging speed with a comparison voltage, may output a comparison result as a comparison result signal, and may set (or adjust) a bias control signal for controlling bias current settings of a plurality of source amplifiers provided in the source driver based on the comparison result signal.

A bias current setting of the source amplifier may be optimized according to a panel load of the display panel 1200, and thus, power consumption of the display apparatus 1000 may be reduced and the yield of the display panel 1200 may be improved.

Figure 17:
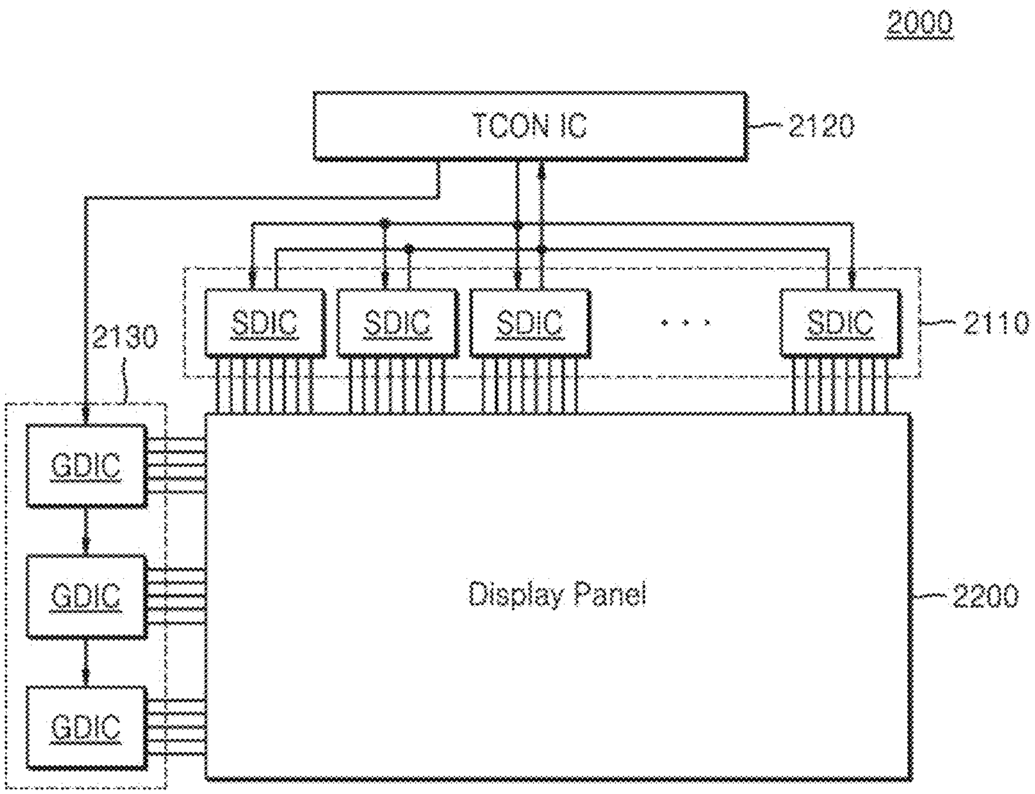
FIG. 17 illustrates an example of a display apparatus, according to one or more example embodiments.

FIG. 17 illustrates an example of a display apparatus, according to one or more example embodiments. The display apparatus of FIG. 17 may include a display panel 2200 having a medium or large size and may be applied to, for example, a television or a monitor.

Referring to FIG. 17, a display apparatus 2000 may include a source driver 2110, a timing controller 2120, a gate driver 2130, and the display panel 2200.

The timing controller 2120 may include one or more ICs or modules. The timing controller 2120 may communicate with a plurality of source driving ICs SDIC and a plurality of gate driving ICs GDIC through a set interface.

The timing controller 2120 may generate control signals for controlling driving timings of a plurality of data driving ICs DDIC and the plurality of gate driving ICs GDIC, and may provide the control signals to the plurality of data driving ICs DDIC and the plurality of gate driving ICs GDIC.

The source driver 2110 may include the plurality of source driving ICs SDIC, and the plurality of source driving ICs SDIC may be mounted on a circuit film such as a TCP, a COF, or an FPC and attached to the display panel 220 by using a TAB method, or may be mounted on a non-display area of the display panel 2200 by using a COG method.

The gate driver 2130 may include the plurality of gate driving IC s GDIC, and the plurality of gate driving ICs GDIC may be mounted on a circuit film and attached to the display panel 220 by using a TAB method, or may be mounted on a non-display area of the display panel 2200 by using a COG method. Alternatively, the gate driver 2130 may be directly formed on a lower substrate of the display panel 2200 by using a gate-driver in panel (GIP) method. The gate driver 2130 may be formed in a non-display area outside a pixel array where sub-pixels PX are formed on the display panel 2200, and may be formed by using the same TFT process as the sub-pixels.

Each of the plurality of source driving ICs SDIC may include the panel load detection circuit 10 (see FIG. 1) and the control logic 20 (see FIG. 1) described with reference to FIGS. 1 to 15. The source driving IC SDIC may include a plurality of source amplifiers, and may adjust bias current settings of the plurality of source amplifiers in accordance with a panel load of corresponding source lines. Accordingly, power consumption of the source driving IC SDIC and the display apparatus 2000 may be reduced and the yield of the display panel 2200 may be improved.

As described above, example embodiments have been illustrated in the drawings and described in the specification. While example embodiments have been described by using specific terms, the terms have merely been used to explain the technical idea of the inventive concept and should not be construed as limiting the scope of the inventive concept defined by the claims. Hence, it should be understood by one of ordinary skill in the art that various modifications and other equivalent embodiments may be made therefrom. Accordingly, the technical scope of the inventive concept should be defined by the following claims and their equivalents.

What is claimed is:

1. A display driving circuit for driving a display panel, the display driving circuit comprising:
 an operational amplifier configured to, in a first phase of a test period, charge a source line of the display panel based on a first voltage received through a first input terminal, and in a second phase of the test period, output a comparison result signal by comparing a second voltage received through the first input terminal with a source line voltage received through a second input terminal;
 a discharge circuit configured to discharge the source line based on a third voltage in the second phase;
 a plurality of switches configured to, in the first phase, electrically connect an output terminal of the operational amplifier to the source line, and in the second phase, electrically connect the discharge circuit to the source line and the second input terminal of the operational amplifier; and
 a control logic configured to control a bias current of the operational amplifier based on the comparison result signal,
 wherein the control logic is configured to adjust a value of the bias current based on a combination of a plurality of levels of the comparison result signal obtained at a plurality of test periods while varying a determination time point or the value of the bias current.

2. The display driving circuit of claim 1, wherein the operational amplifier comprises a source amplifier configured to provide a source voltage according to pixel data to the source line during a display period.

3. The display driving circuit of claim 1, wherein the discharge circuit comprises a buffer provided in a grayscale voltage generation circuit configured to generate a grayscale voltage during a display period.

4. The display driving circuit of claim 1, wherein the discharge circuit comprises a transistor to which the third voltage is applied.

5. The display driving circuit of claim 1, wherein the plurality of switches comprise:
 a first switch configured to electrically connect the output terminal of the operational amplifier to an output pad electrically connected to the source line;
 a second switch configured to electrically connect the output terminal of the operational amplifier to the second input terminal of the operational amplifier;
 a third switch configured to electrically connect the second input terminal of the operational amplifier to the output pad; and
 a fourth switch configured to electrically connect the discharge circuit to the output pad.

6. The display driving circuit of claim 5, wherein the first switch is configured to, in response to a first switching signal, be turned on in the first phase and be turned off in the second phase,
 wherein the third switch and the fourth switch are configured to, in response to a second switching signal, be turned off in the first phase and be turned on in the second phase, and
 wherein the second switch is configured to, in response to a complementary signal to the second switching signal, be turned on in the first phase and be turned off in the second phase.

7. The display driving circuit of claim 1, wherein the plurality of switches comprise:
 a first switch configured to electrically connect the output terminal of the operational amplifier to an output pad connected to the source line;
 a second switch configured to electrically connect the output terminal of the operational amplifier to the second input terminal of the operational amplifier;
 a third switch configured to electrically connect the second input terminal of the operational amplifier to a test pad electrically connected to the source line; and
 a fourth switch configured to electrically connect the discharge circuit to the test pad.

8. The display driving circuit of claim 1, wherein, based on the source line voltage being equal to or lower than the second voltage, the comparison result signal transitions from a first level to a second level, and
 wherein a transition time point at which the comparison result signal transitions from the first level to the second level is accelerated based on an increase in the bias current of the operational amplifier.

9. The display driving circuit of claim 8, wherein the control logic is further configured to adjust a bias control signal for controlling the bias current of the operational amplifier, based on the combination of the plurality of levels of the comparison result signal.

10. The display driving circuit of claim 9, wherein the control logic is further configured to:
 obtain a level of the comparison result signal based on a first determination time point during a first test period;
 obtain a level of the comparison result signal at a second determination time point during a second test period, a position of the second determination time point in the second test period being earlier than a position of the first determination time point in the first test period;
 obtain a level of the comparison result signal at a third determination time point during a third test period, a position of the third determination time point in the third test period being later than the position of the first determination time point in the first test period; and
 set the bias control signal, to be applied in a display period, based on the levels of the comparison result signal obtained during the first test period, the second test period, and the third test period,
 wherein the bias control signal has a first value during the first test period, the second test period, and the third test period.

11. The display driving circuit of claim 10, wherein the control logic is further configured to, based on the comparison result signal obtained during the second test period being at the first level, the comparison result signal obtained during the first test period being at the second level, and the comparison result signal obtained during the third test period being at the second level, set the bias control signal, to be applied to the display period, to the first value.

12. The display driving circuit of claim 10, wherein the control logic is further configured to:
 based on the levels the comparison result signal obtained during the first test period, the second test period, and the third test period being at the first level, set the bias control signal to be applied to the display period to a second value, the second value being greater than the first value; and based on the levels of the comparison result signal obtained during the first test period, the second test period, and the third test period being at the second level, set the bias control signal to be applied to the display period to a third value, the third value being less than the first value.

13. The display driving circuit of claim 9, wherein the control logic is further configured to:

based on a level of the comparison result signal obtained during a first test period in which the bias control signal has a first value being the first level, increase a value of the bias control signal to a second value to increase the bias current; and based on a level of the comparison result signal obtained during a second test period that is subsequent to the first test period and in which the bias control signal has the second value being the second level, set the bias control signal to be applied to a display period to the second value.

14. The display driving circuit of claim 9, wherein the control logic is further configured to:

based on a level of the comparison result signal obtained during a first test period in which the bias control signal has a first value being the second level, reduce a value of the bias control signal to a third value to reduce the bias current; and based on a level of the comparison result signal obtained during a second test period that is subsequent to the first test period and in which the bias control signal has the third value being the first level, set the bias control signal to be applied to a display period to the first value.

15. A display driving circuit for driving a panel on which an image is displayed, the display driving circuit comprising:

a plurality of source amplifiers, each of which is configured to, during a display period, buffer a source voltage received through a first input terminal and output the buffered source voltage to a corresponding source line from among a plurality of source lines of the panel;

a charge/discharge circuit configured to, during a test period, charge or discharge a source line electrically connected to the charge/discharge circuit; and a plurality of switches configured to control an electrical connection between a second input terminal and an output terminal of a first source amplifier from among the plurality of source amplifiers and an electrical connection between the charge/discharge circuit and a first source line of the panel corresponding to the first source amplifier, wherein the first source amplifier is configured to, during the test period, output a comparison result signal by comparing a comparison voltage received through the first input terminal with a voltage of the first source line charged or discharged by the charge/discharge circuit, and wherein the display driving circuit further comprises a control logic configured to adjust a value of a bias current of the plurality of source amplifiers based on a combination of a plurality of levels of the comparison result signal obtained at a plurality of test periods while varying a determination time point or the value of the bias current.

16. The display driving circuit of claim 15, wherein the control logic is configured to adjust a value of a bias setting register based on the combination of the plurality of levels of the comparison result signal, the bias setting register being configured to control the bias current of the plurality of source amplifiers.

17. The display driving circuit of claim 16, wherein the control logic is further configured to:

obtain a level of the comparison result signal at a first determination time point during a first test period, obtain a level of the comparison result signal at a second determination time point, and obtain a level of the comparison result signal at a third determination time point, wherein a position of the second determination time point in a second test period being earlier than a position of the first determination time point in the first test period, and a position of the third determination time point being later than the position of the first determination time point in the first test period; and adjust the value of the bias setting register based on a combination of the levels of the comparison result signal obtained at the first determination time point, the second determination time point, and the third determination time point.

18. The display driving circuit of claim 17, wherein the control logic is further configured to set the first determination time point based on a value of a first register and set the second determination time point and the third determination time point based on a value of a second register configured to set a range in which the determination time point is variable.

19. An operating method of a display driving circuit for driving a display panel, the operating method comprising:

charging, by a source amplifier, a source line of the display panel based on a first voltage;

discharging, by a charge/discharge circuit, the source line based on a second voltage lower than the first voltage;

outputting, by the source amplifier, a comparison result signal by comparing a comparison voltage applied to a first input terminal with a voltage of the source line applied to a second input terminal; and adjusting, by a control logic, a bias control signal for controlling a bias current of the source amplifier based on a combination of a plurality of levels of the comparison result signal obtained at a plurality of test periods while varying a determination time point or a value of the bias control signal.

20. The operating method of claim 19, wherein values of the bias control signal are set differently during the plurality of test periods, and wherein the charging of the source line, the discharging of the source line, and the outputting of the comparison result signal are performed during each of the plurality of test periods.

* * * * *